(12) United States Patent
Ohgami et al.

(10) Patent No.: US 10,890,815 B2
(45) Date of Patent: Jan. 12, 2021

(54) DISPLAY APPARATUS

(71) Applicant: Sharp Kabushiki Kaisha, Sakai (JP)

(72) Inventors: Hiroyuki Ohgami, Sakai (JP); Junichi Morinaga, Sakai (JP); Takahiro Koshiba, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/799,991

(22) Filed: Feb. 25, 2020

(65) Prior Publication Data
US 2020/0310205 A1 Oct. 1, 2020

(30) Foreign Application Priority Data

Feb. 26, 2019 (JP) .................. 2019-032995

(51) Int. Cl.
*G02F 1/1362* (2006.01)
*G02F 1/1368* (2006.01)

(52) U.S. Cl.
CPC ...... *G02F 1/136213* (2013.01); *G02F 1/1368* (2013.01); *G02F 1/136209* (2013.01); *G02F 1/136286* (2013.01)

(58) Field of Classification Search
CPC ................................. G02F 1/136213
See application file for complete search history.

(56) References Cited

U.S. PATENT DOCUMENTS

| 6,067,140 A * | 5/2000 | Woo ................ G02F 1/133509 349/110 |
| 2009/0284703 A1 | 11/2009 | Shoraku et al. |
| 2011/0102713 A1* | 5/2011 | Hashimoto ....... G02F 1/133512 349/99 |

FOREIGN PATENT DOCUMENTS

WO 2006/132369 A1 12/2006

* cited by examiner

*Primary Examiner* — Edmond C Lau
(74) *Attorney, Agent, or Firm* — Keating & Bennett, LLP

(57) ABSTRACT

A display apparatus includes: a liquid crystal layer including liquid crystal molecules; a plurality of domains; an alignment boundary portion; an alignment film; a pixel electrode; a connection portion arranged to be overlapped with at least a part of the alignment boundary portion; and a capacitor forming portion that is arranged to be partially overlapped with a part of the connection portion with an insulating film in between and forms electrostatic capacitance. The connection portion and the capacitor forming portion extend along at least a part of the alignment boundary portion, have respective non-overlapping portions in which the connection portion and the capacitor forming portion are not overlapped with each other in a crossing direction crossing an extension direction of the connection portion and the capacitor forming portion, and arrangement of the non-overlapping portions in the crossing direction is switched between one side and another side in the extension direction.

15 Claims, 17 Drawing Sheets

FIG.7
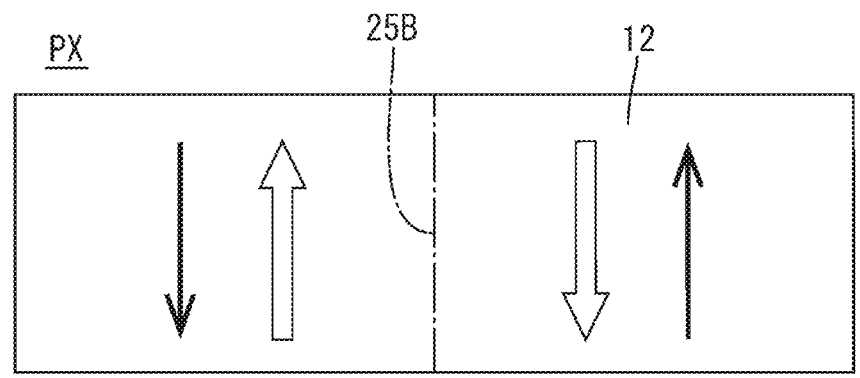
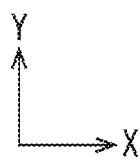
FIG.8
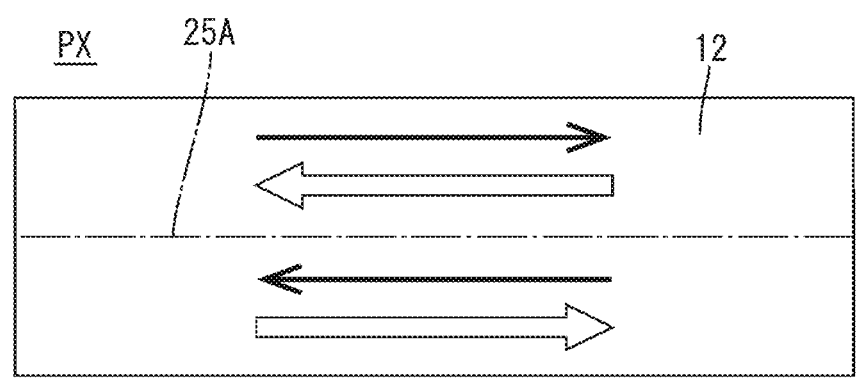
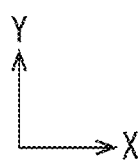

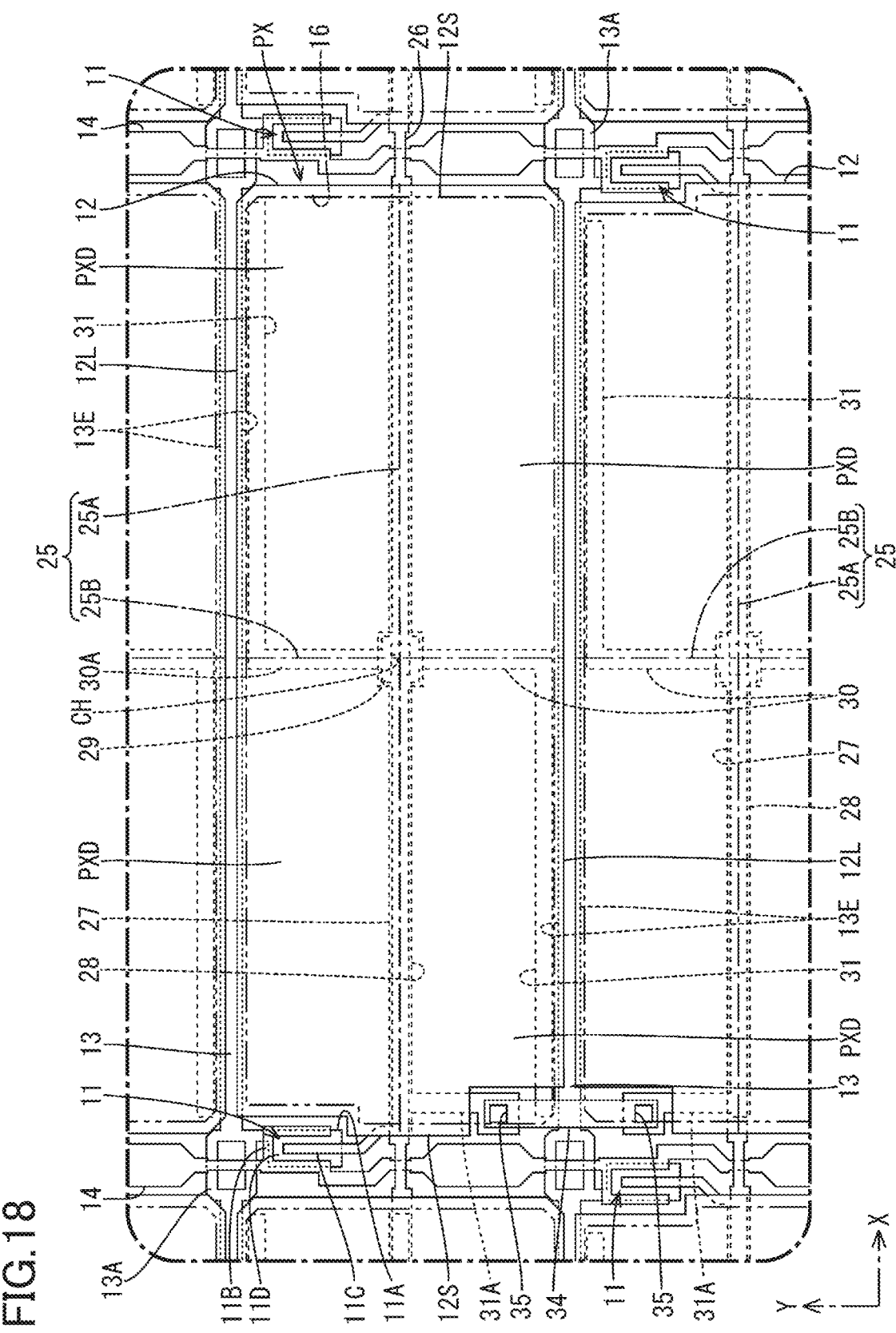

DISPLAY APPARATUS

BACKGROUND

1. Field

The present disclosure relates to a display apparatus.

2. Description of the Related Art

As an example of liquid crystal display apparatuses in the related art, one described in International Publication No. 2006/132369 is known. The liquid crystal display apparatus described in International Publication No. 2006/132369 has a vertical alignment liquid crystal layer, a first substrate, a second substrate, a first electrode provided on the first substrate so as to face the liquid crystal layer, a second electrode provided on the second substrate so as to face the liquid crystal layer, and at least one alignment film provided in contact with the liquid crystal layer. A pixel region has a first liquid crystal domain in which liquid crystal molecules are tilted in a predetermined first direction around a center of a plane of the liquid crystal layer and a middle of the liquid crystal layer in a thickness direction when a voltage is applied. The first liquid crystal domain is close to at least a part of an edge of the first electrode, and at least the part includes a first edge portion in which an azimuthal direction that is perpendicular to the part and points toward an inside of the first electrode defines an angle greater than 90° with respect to the first direction. Either the first substrate or the second substrate has a light shielding member that includes a first light shielding portion for selectively shielding at least a part of the first edge portion from light.

At a center portion of a sub-pixel electrode in the liquid crystal display apparatus described in International Publication No. 2006/132369, a storage capacitor (CS) is formed by an extended portion of a drain extension line, an extended portion of a CS bus line, and an insulating layer (for example, a gate insulating layer) between them. The extended portion of the CS bus line is wider than the extended portion of the drain extension line and has portions outwardly protruding from both side edges in the extended portion of the drain extension line. The protruding portions enable a positional shift generated between the CS bus line and the drain extension line at a time of manufacturing to be absorbed. However, the extended portion of the CS bus line tends to be wider and a light shielding range by the extended portion of the CS bus line becomes wide, so that it may be difficult to sufficiently ensure a quantity of light transmission of the sub-pixel electrode.

An aspect of the disclosure is completed on the basis of circumstances as described above and suppresses a variation of electrostatic capacitance while narrowing a light shielding range.

SUMMARY

According to an aspect of the disclosure, a display apparatus includes: a liquid crystal layer that includes liquid crystal molecules; a plurality of domains that are different in alignment direction of the liquid crystal molecules when a voltage is applied to the liquid crystal layer; an alignment boundary portion that is positioned in a boundary of the plurality of domains; an alignment film that aligns the liquid crystal molecules; a pixel electrode; a connection portion that is connected to the pixel electrode and arranged so as to be overlapped with at least a part of the alignment boundary portion; and a capacitor forming portion that is arranged so as to be partially overlapped with a part of the connection portion with an insulating film in between and forms electrostatic capacitance between the capacitor forming portion and the connection portion. The connection portion and the capacitor forming portion extend along at least a part of the alignment boundary portion, have respective non-overlapping portions in which the connection portion and the capacitor forming portion are not overlapped with each other in a crossing direction that crosses an extension direction of the connection portion and the capacitor forming portion, and are provided so that arrangement of the non-overlapping portions in the crossing direction is switched between one side and the other side in the extension direction.

BRIEF DESCRIPTION OF THE DRAWINGS

FIG. 7 is a view for explaining an alignment process in an alignment film of the array substrate;

FIG. 8 is a view for explaining an alignment process in an alignment film of a CF substrate constituting the liquid crystal panel;

FIG. 18 is a plan view illustrating a pixel array in an array substrate constituting a liquid crystal panel according to another embodiment of the disclosure.

DESCRIPTION OF THE EMBODIMENTS

Embodiment 1

Figure 1:
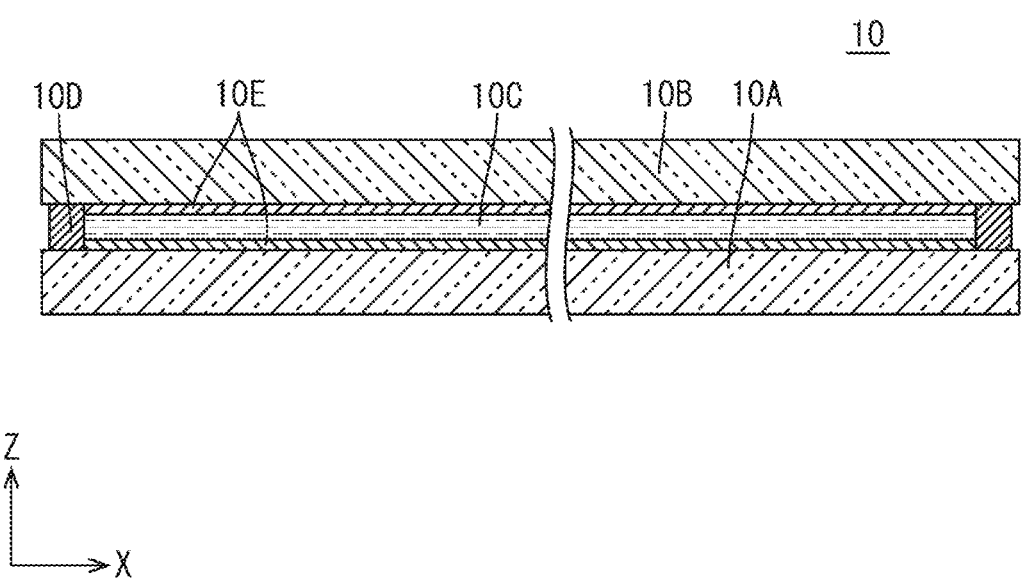
FIG. 1 is a sectional view of a liquid crystal panel according to Embodiment 1 of the disclosure.

Embodiment 1 of the disclosure will be described with reference to FIGS. 1 to 10. The present embodiment exemplifies an array substrate 10A that constitutes a liquid crystal panel (display apparatus) 10. Note that, an X-axis, a Y-axis, and a Z-axis are illustrated at a part of each of drawings and X-axis, Y-axis, and Z-axis directions represent directions illustrated in the drawings. An upper side and a lower side in FIGS. 1, 3, 4, 5, and 6 are respectively defined as a front side and a back side.

FIG. 1 is a schematic sectional view of the liquid crystal panel 10. As illustrated in FIG. 1, the liquid crystal panel 10 includes the array substrate 10A, a CF substrate (facing substrate) 10B arranged so as to face the array substrate 10A, a liquid crystal layer 10C interposed between both the substrates 10A and 10B, a seal portion 10D that surrounds and seals the liquid crystal layer 10C, and a pair of alignment films 10E that is provided in innermost surfaces of the pair of substrates 10A and 10B so as to face the liquid crystal layer 10C. Respective polarizers are attached to outer surface sides of both the substrates 10A and 10B.

Figure 2:
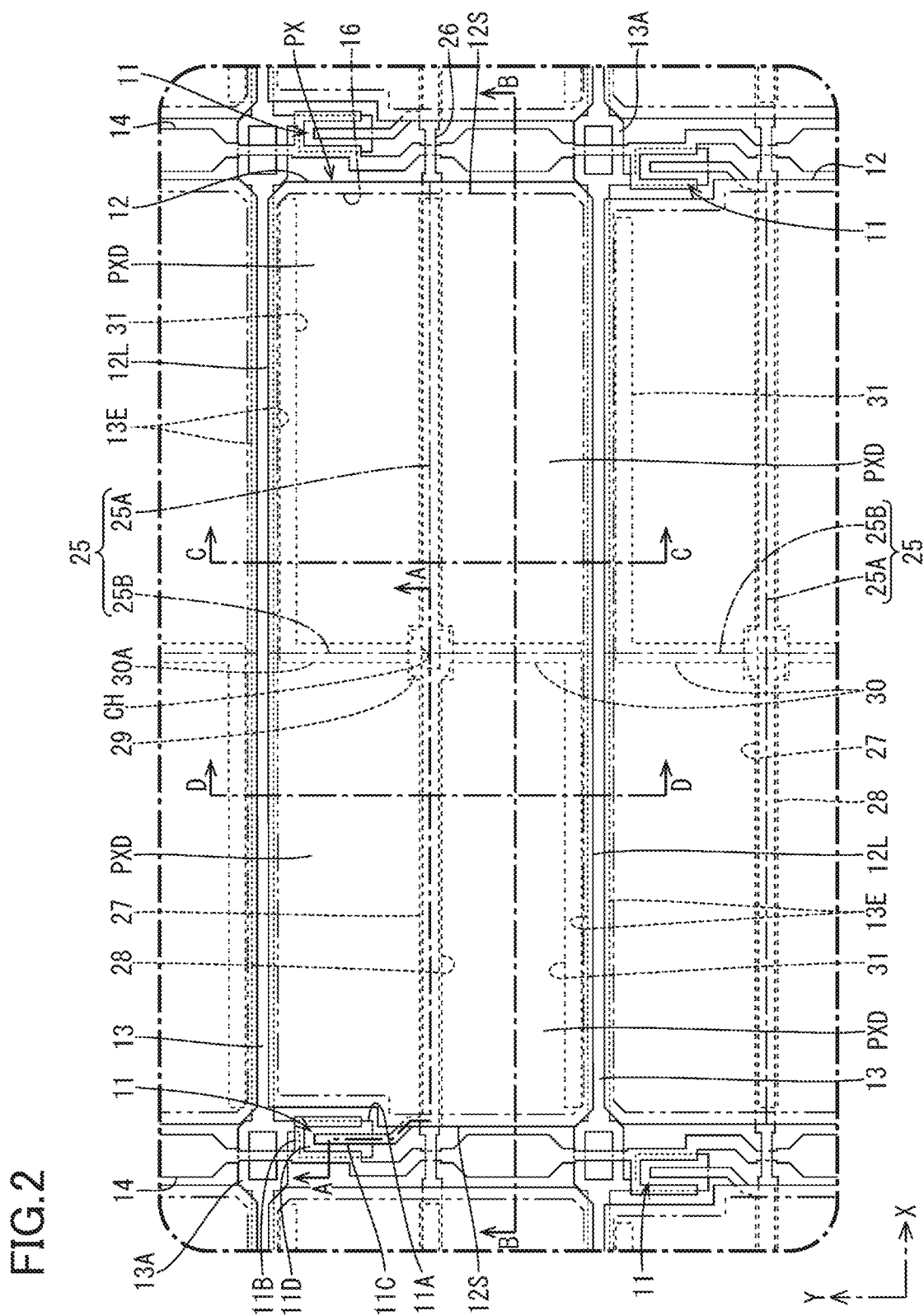
FIG. 2 is a plan view illustrating a pixel array in an array substrate constituting the liquid crystal panel.

The liquid crystal panel 10 has a display surface divided into a display region where an image is able to be displayed and a non-display region surrounding the display region. FIG. 2 is a plan view illustrating a pixel array in the display region of the array substrate 10A. Note that, FIG. 2 also illustrates a part of a configuration of the CF substrate 10B. In the display region of the array substrate 10A, as illustrated in FIG. 2, a plurality of TFTs (switching elements, thin film transistors) 11 and a plurality of pixel electrodes 12 connected to the TFTs 11 are provided in line in a matrix form (in rows and columns) along the X-axis direction and the Y-axis direction. Gate lines (scanning lines) 13 and source lines (image lines, data lines) 14, which form a substantially grid pattern, are arranged so as to surround the TFTs 11 and the pixel electrodes 12. Each of the TFTs 11 has at least a gate electrode 11A connected to a gate line 13, a source electrode 11B connected to a source line 14, and a drain electrode 11C connected to a pixel electrode 12. The TFT 11 is located on a left side or on a right side illustrated in FIG. 2 in the X-axis direction relative to the pixel electrode 12 (source line 14). The TFT 11 located on the left side relative to the pixel electrode 12 (source line 14) and the TFT 11 located on the right side relative to the pixel electrode 12 (source line 14) are alternately and repeatedly arrayed in the Y-axis direction and in a zigzag (staggered) manner in plan view. Note that, a gate circuit portion that supplies a scanning signal to the gate line 13 is desired to be monolithically provided in the array substrate 10A. Moreover, a driver that supplies an image signal to the source line 14 is mounted on the array substrate 10A by a COG (Chip On Glass) method.

As illustrated in FIG. 2, the pixel electrode 12 has a horizontally-long longitudinal shape in plan view, specifically, a substantially rectangular shape, and a longitudinal direction coincides with the X-axis direction and a transverse direction coincides with the Y-axis direction. A ratio of a longitudinal dimension to a transverse dimension in the pixel electrode 12 is, for example, about 3. While the gate line 13 is interposed between pixel electrodes 12 adjacent to each other in the transverse direction (Y-axis direction), the source line 14 is interposed between pixel electrodes 12 adjacent to each other in the longitudinal direction (X-axis direction). The pixel electrode 12 is arranged so as not to be overlapped with the gate line 13 or the source line 14 in plan view. The gate line 13 extends along the longitudinal direction (X-axis direction) of the pixel electrode 12 and a plurality of gate lines 13 are arranged in line with an interval of almost the transverse dimension of the pixel electrode 12 in the transverse direction. Each of the gate lines 13 has a portion (hereinafter, referred to as an annular portion 13A) forming a horizontally-long quadrilateral annular shape in plan view at a crossing portion with each of the source lines 14. In a case where a defect of short-circuit between the gate line 13 and the source line 14 is caused at the crossing portion of the gate line 13 and the source line 14, the annular portion 13A is able to separate a short-circuit portion from the gate line 13 by laser radiation or the like. The installation number of gate lines 13 coincides with the number of pixel electrodes 12 arranged in the Y-axis direction. The source line 14 extends along the transverse direction of the pixel electrode 12 and a plurality of source lines 14 are arranged in line with an interval of almost the longitudinal dimension of the pixel electrode 12 in the longitudinal direction. The source line 14 is almost orthogonal to (crossing) the gate line 13. The installation number of source lines 14 coincides with the number of pixel electrodes 12 arranged in the X-axis direction. According to such a configuration, as compared to a case where the pixel electrode is assumed to have a vertically-long longitudinal shape, an interval at which the source lines 14 are arranged almost corresponds to a ratio (for example, about ⅓) obtained by dividing the transverse dimension of the pixel electrode 12 by the longitudinal dimension thereof, and, accordingly, the installation number of source lines 14 per unit length in the X-axis direction almost corresponds to a ratio (for example, about ⅓) similar to the above. Note that, as compared to the case where the pixel electrode is assumed to have a vertically-long longitudinal shape, an interval at which the gate lines 13 are arranged almost corresponds to a ratio (for example, about 3) obtained by dividing the longitudinal dimension of the pixel electrode 12 by the transverse dimension thereof, and, accordingly, the installation number of gate lines 13 per unit length in the X-axis direction almost corresponds to a ratio (for example, about 3) similar to the above. This makes it possible to reduce the installation number of source lines 14, so that the number of image signals to be supplied to the source lines 14 is reduced. As a result, since the installation number of drivers that supply signals to the source lines 14 is able to be reduced and an inexpensive driver is able to be used, it is possible to achieve a narrow frame and cost reduction of the liquid crystal panel 10 even when improvement of definition of the liquid crystal panel 10 progresses.

Figure 3:
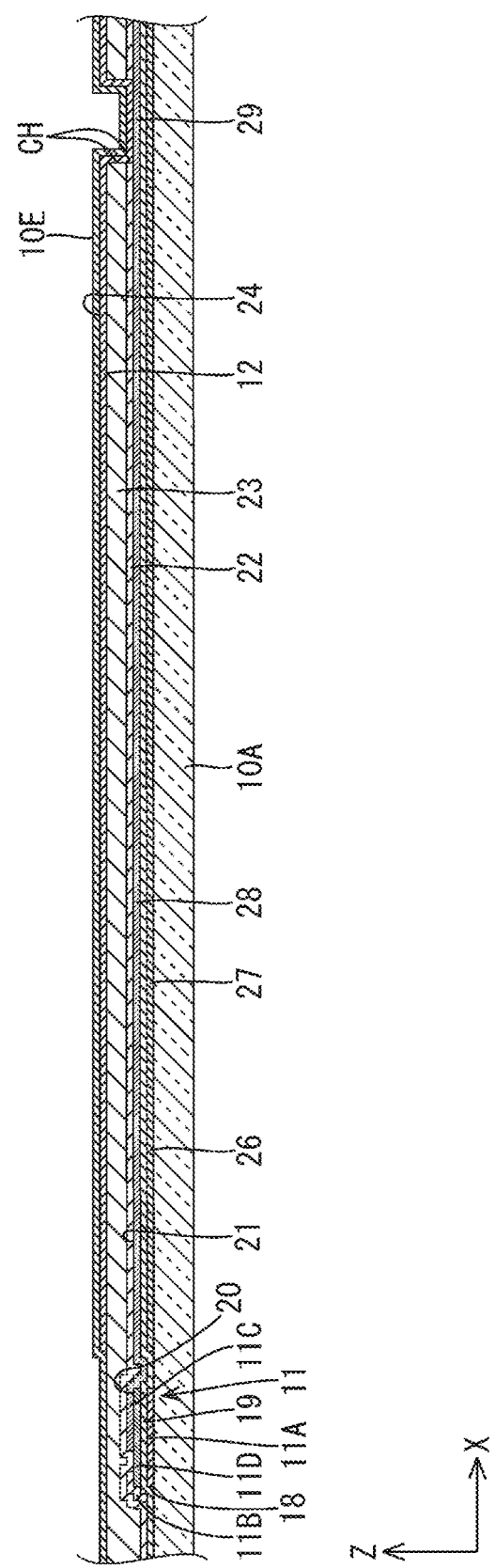
FIG. 3 is a sectional view of the array substrate taken along a line III-III of FIG. 2.

FIG. 3 is a sectional view of the array substrate 10A taken along a line III-III of FIG. 2. A configuration of the TFT 11 will be described in detail with reference to FIGS. 2 and 3. As illustrated in FIGS. 2 and 3, the TFT 11 is arranged so as to be adjacent to the pixel electrode 12, which is to be connected, on a left side or a right side illustrated in FIG. 2 in the X-axis direction. The TFT 11 has the gate electrode 11A continued to the gate line 13. The gate electrode 11A is branched so as to protrude downwardly as illustrated in FIG. 2 from the annular portion 13A in the gate line 13 and has a vertically-long quadrilateral shape in plan view. The TFT 11 has the source electrode 11B continued to the source line 14. The source electrode 11B forms a channel shape that is bent along three sides of the gate electrode 11A and is opened toward a lower side illustrated in FIG. 2 in plan view. The TFT 11 has the drain electrode 11C arranged at a position separated from the source electrode 11B. The drain electrode 11C is opposed to three side portions of the source electrode 11B, extends from an opening portion of the source electrode 11B along the Y-axis direction, and is then bent so as to extend along the X-axis direction. A part of the drain electrode 11C, which extends along the X-axis direction, is overlapped with a part of the pixel electrode 12 in plan view and connected to the part, and constitutes a connection portion 28 with the pixel electrode 12. A detailed configuration of the connection portion 28 will be described later again. The TFT 11 has a channel portion 11D that is overlapped with the gate electrode 11A and connected to the source electrode 11B and the drain electrode 11C. The channel portion 11D has a quadrilateral shape in plan view similarly to the gate electrode 11A and has three side portions connected to the source electrode 11B and a portion including the other one side portion connected to the drain electrode 11C. Further, when a scanning signal transferred to the gate line 13 is supplied to the gate electrode 11A so that the TFT 11 is driven, an image signal (data signal) transferred to the source line 14 is supplied from the source electrode 11B to the drain electrode 11C through the channel portion 11D. As a result, the pixel electrode 12 is charged to a potential according to the image signal.

Figure 4:
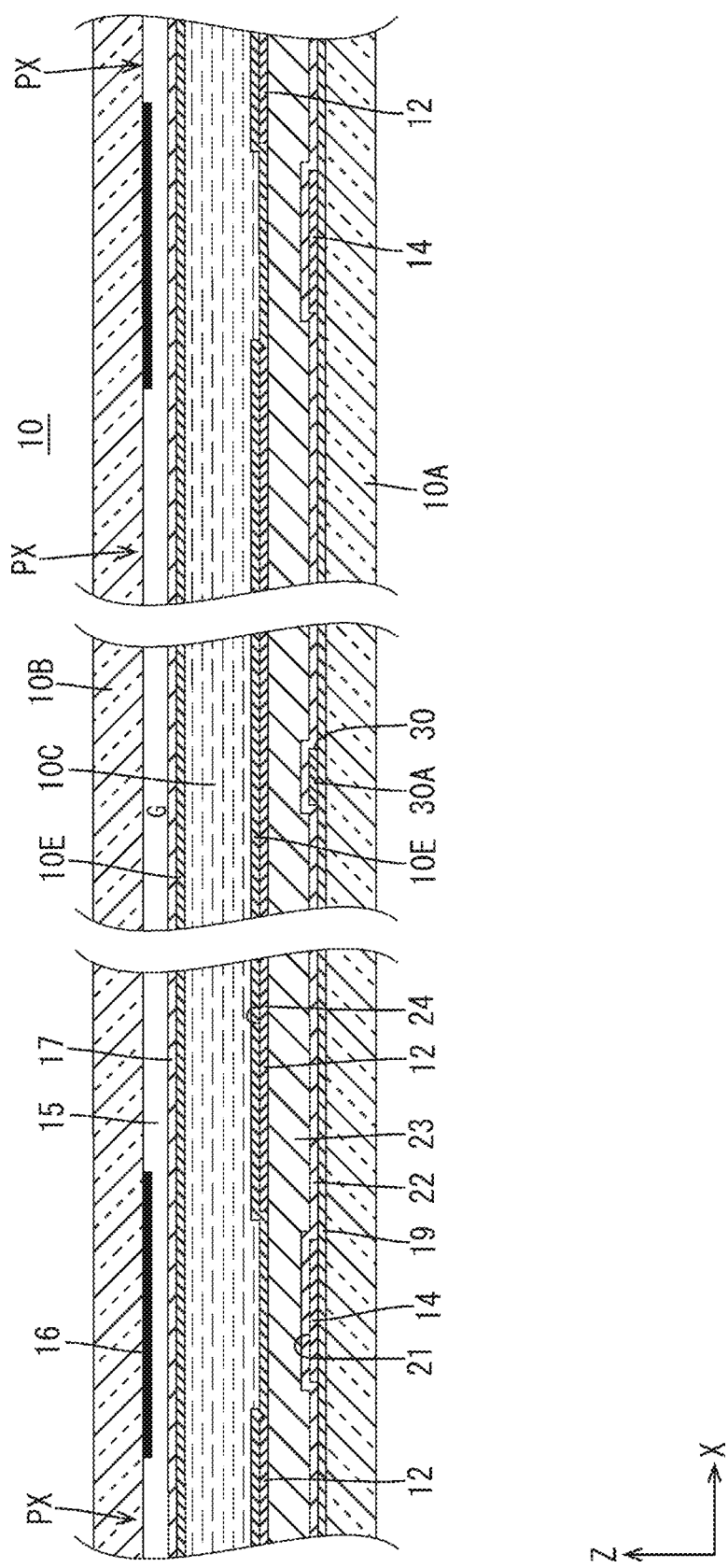
FIG. 4 is a sectional view of the liquid crystal panel taken along a line IV-IV of FIG. 2.
Figure 5:
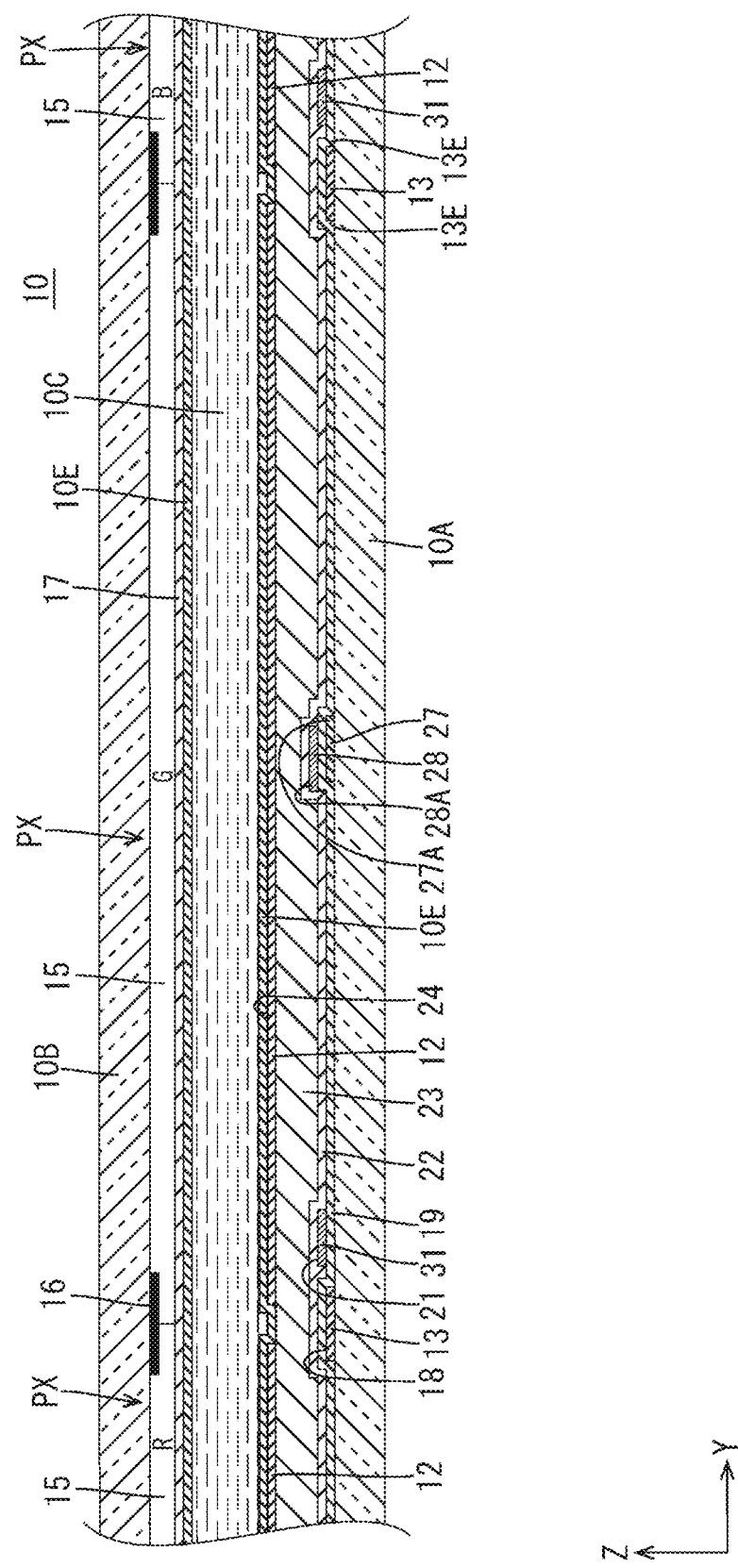
FIG. 5 is a sectional view of the liquid crystal panel taken along a line V-V of FIG. 2.
Figure 6:
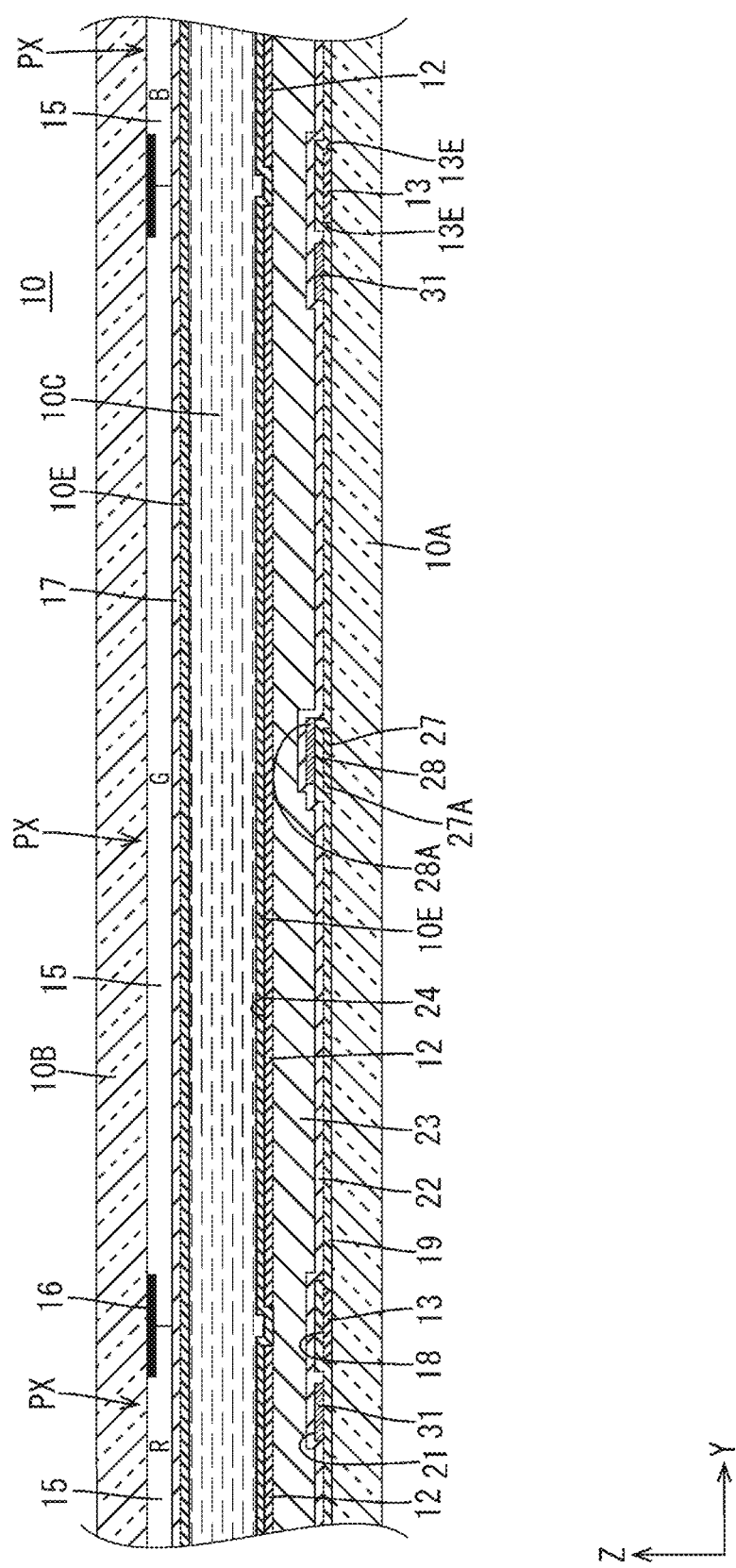
FIG. 6 is a sectional view of the liquid crystal panel taken along a line VI-VI of FIG. 2.

FIG. 4 is a sectional view of the liquid crystal panel 10 taken along a line IV-IV of FIG. 2. FIG. 5 is a sectional view of the liquid crystal panel 10 taken along a line V-V of FIG. 2. FIG. 6 is a sectional view of the liquid crystal panel 10 taken along a line VI-VI of FIG. 2. In a display region of the CF substrate 10B, three color filters 15 representing blue (B), green (G), and red (R) are provided as illustrated in FIGS. 4 to 6. A plurality of color filters 15 are arrayed in line in a matrix form in each of the X-axis direction and the Y-axis direction so as to be overlapped with the respective pixel electrodes 12 on the array substrate 10A side in plan view. The color filters 15 representing different colors are repeatedly arranged along the source lines 14 (Y-axis direction) and the color filters 15 representing the same color are continuously arranged along the gate lines 13 (X-axis direction). In the liquid crystal panel 10, the color filters 15 of R, G, and B arranged along the Y-axis direction and three pixel electrodes 12 facing the respective color filters 15 form pixel portions PX of three colors. Further, in the liquid crystal panel 10, the pixel portions PX of three colors R, G, and B adjacent to one another along the Y-axis direction form a display pixel capable of color display in predetermined tone. In the display region of the CF substrate 10B, a black matrix (inter-pixel light shielding portion) 16 that has a substantially grid pattern so as to separate the adjacent color filters 15 is provided. The black matrix 16 makes light difficult to travel between the adjacent pixel portions PX, so that color mixture or the like is suppressed. A facing electrode 17 is formed on inner surface sides of the color filters 15. The facing electrode 17 is provided in a solid state at least in the display region and faces all the pixel electrodes 12 with the liquid crystal layer 10C held therebetween. When a reference potential (common potential) is supplied to the facing electrode 17, a potential difference is generated between the facing electrode 17 and the pixel electrodes 12 charged by the TFTs 11. An alignment state of liquid crystal molecules of the liquid crystal layer 10C changes in accordance with the potential difference, so that predetermined tone display is able to be performed for each of the pixel portions PX. It is desirable that an overcoat film for flattening is formed between the color filters 15 and the facing electrode 17.

The array substrate 10A has various films formed in layers on an inner surface side of a glass substrate (substrate) as illustrated in FIGS. 3 to 6. Specifically, the array substrate 10A has a first metal film (conductor film, gate metal film) 18, a gate insulating film (first insulating film) 19 arranged on an upper layer side of the first metal film 18, a semiconductor film 20 arranged on an upper layer side of the gate insulating film 19, a second metal film (conductor film, source metal film) 21 arranged on an upper layer side of the semiconductor film 20, an inter-layer insulating film (insulating film, second insulating film) 22 arranged on an upper layer side of the second metal film 21, a flattening film (insulating film, third insulating film) 23 arranged on an upper layer side of the inter-layer insulating film 22, a transparent electrode film 24 arranged on an upper layer side of the flattening film 23, and an alignment film 10E arranged on an upper layer side of the transparent electrode film 24.

Each of the first metal film 18 and the second metal film 21 is a single layer film made of one kind of metal material or a laminated film made of different kinds of metal materials or alloy and thus has conductivity and a light shielding property. The first metal film 18 forms the gate lines 13, gate electrodes 11A of the TFTs 11, and the like as illustrated in FIGS. 3 to 6. The second metal film 21 forms the source lines 14, source electrodes 11B of the TFTs 11, and the like. The semiconductor film 20 is an oxide semiconductor film using a material of, for example, oxide semiconductor. The semiconductor film 20 forms channel portions 11D of the TFTs 11 and the like. The transparent electrode film 24 is made of a transparent electrode material, for example, such as ITO (Indium Tin Oxide) or IZO (Indium Zinc Oxide), and forms the pixel electrodes 12 and the like.

Each of the gate insulating film 19 and the inter-layer insulating film 22 is made of $SiO_2$ (oxide silicon, silicon oxide), $SiN_x$ (silicon nitride), or the like as one kind of inorganic insulating material (inorganic resin material). The flattening film 23 is made of PMMA (acrylic resin) or the like as one kind of organic insulating material (organic material). The gate insulating film 19 is interposed between the first metal film 18 and the semiconductor film 20 and insulates them. In particular, a part of the gate insulating film 19, which is interposed between the gate line 13 formed of the first metal film 18 and the source line 14 formed of the second metal film 21 that cross with each other, insulates both the lines 13 and 14. The inter-layer insulating film 22 and the flattening film 23 are interposed between the transparent electrode film 24 and a set of the semiconductor film 20 and the second metal film 21 to insulate them. The flattening film 23 among them has a film thickness greater than those of the other insulating films 19 and 22 made of an inorganic resin material and functions to flatten a surface of the array substrate 10A. At a position where the inter-layer insulating film 22 and the flattening film 23 are overlapped with a portion where the drain electrode 11C of the TFT 11 and the pixel electrode 12 are overlapped, a contact hole CH is formed so as to be opened. Thus, the connection portion 28 of the drain electrode 11C and a part of the pixel electrode 12 that are overlapped with each other are connected through the contact hole CH.

Figure 9:
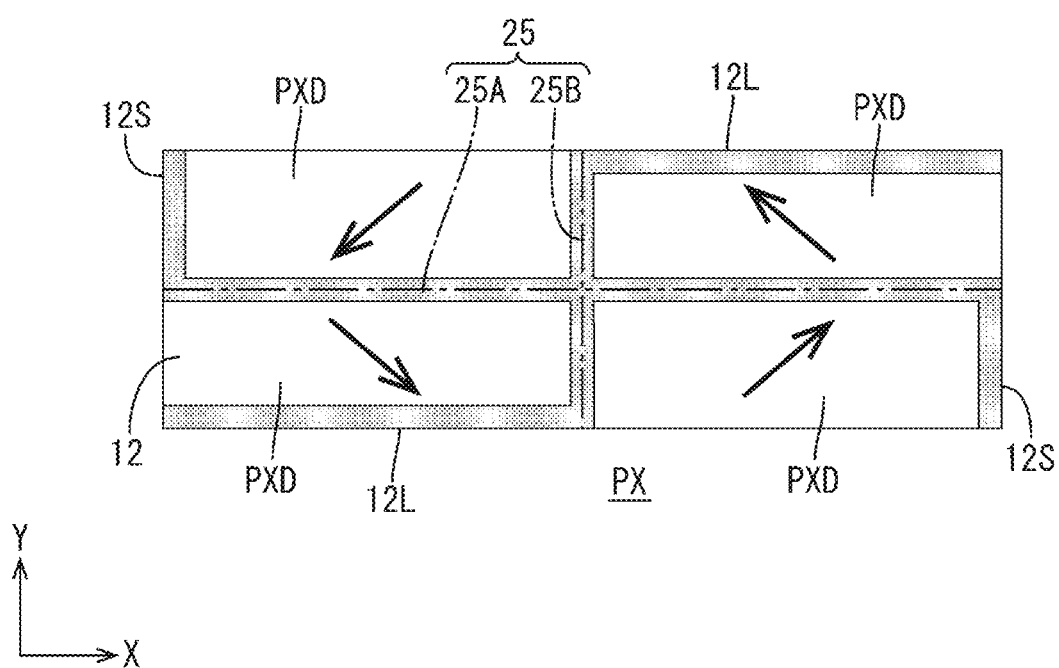
FIG. 9 is a view for explaining, for example, a tilt direction of liquid crystal molecules in one pixel portion of the liquid crystal panel.

Here, the alignment films 10E will be described in detail with reference to FIGS. 7 to 9. FIG. 7 is a view for explaining an alignment process in the alignment film 10E of the array substrate 10A and illustrates the array substrate 10A as viewed from a side of the liquid crystal layer 10C. FIG. 8 is a view for explaining an alignment process in the alignment film 10E of the CF substrate 10B and illustrates the CF substrate 10B as viewed from a side opposite to the liquid crystal layer 10C, that is, a side where a polarizer is attached. FIG. 9 is a view for explaining, for example, a tilt direction (alignment direction) of liquid crystal molecules in one pixel portion PX of the liquid crystal panel 10 and is a view as viewed from a side of the CF substrate 10B with the array substrate 10A on a lower side and the CF substrate 10B on an upper side. Each of the alignment films 10E provided in the innermost surface of each of the substrates 10A and 10B is a vertical alignment film that causes long axes of the liquid crystal molecules included in the liquid crystal layer 10C to be aligned substantially vertical to a film surface of the substrate in a state where no voltage is applied to the liquid crystal layer 10C. That is, the liquid crystal panel 10 according to the present embodiment has a VA (Vertical Alignment) mode as a display mode, and is, more specifically a 4D-RTN (4-Domain Reverse Twisted Nematic) mode in which alignment of liquid crystal molecules is different in each of four domains PXD obtained by dividing the pixel portion PX, for example. Specifically, the alignment films 10E are photo alignment films surfaces of which are subjected to a photo alignment process to allow application of alignment restriction force to the liquid crystal molecules, and an appropriate photo alignment process is performed for a plurality of domains PXD described above. That is, for the alignment film 10E on the array substrate 10A side, as illustrated in FIG. 7, respective two regions arranged along the X-axis direction with a center position of each of the pixel portions PX in the X-axis direction as a boundary are irradiated with alignment process light rays (polarizing ultraviolet rays), directions of which are opposite to each other, along the Y-axis direction during a manufacturing process. In FIG. 7, an irradiation direction of an alignment process light ray is illustrated by an outlined white arrow and a tilt direction (alignment direction, direction in which the liquid crystal molecules fall when a voltage is applied to the liquid crystal layer) of the liquid crystal molecules is illustrated by an arrow of a solid line. In the present embodiment, a left-side region illustrated in FIG. 7 is irradiated with an upward alignment process light ray of the figure and a right-side region illustrated in FIG. 7 is irradiated with a downward alignment process light ray of the figure. Note that, when the alignment process light rays whose directions are opposite to each other are radiated, a mask is used to avoid radiation of the alignment process light rays to an unnecessary portion. On the other hand, for the alignment film 10E on the CF substrate 10B side, as illustrated in FIG. 8, respective two regions arranged along the Y-axis direction with a center position of each of the pixel portions PX in the Y-axis direction as a boundary are irradiated with alignment process light rays, directions of which are opposite to each other, along the X-axis direction during a manufacturing process. In FIG. 8, an irradiation direction of an alignment process light ray is illustrated by an outlined white arrow and a tilt direction of the liquid crystal molecules is illustrated by an arrow of a solid line. In the present embodiment, an upper-side region illustrated in FIG. 8 is irradiated with a leftward alignment process light ray of the figure and a lower-side region illustrated in FIG. 8 is irradiated with a rightward alignment process light ray of the figure.

By the pair of alignment films 10E subjected to such a light alignment process, the pixel portion PX is divided into four domains PXD whose tilt directions of the liquid crystal molecules are different from each other, as illustrated in FIG. 9. In FIG. 9, the tilt directions of the liquid crystal molecules near the middle of the liquid crystal layer 10C in the thickness direction are illustrated by arrows of solid lines. The four domains PXD are arranged in a matrix form in which two domains are arranged in the X-axis direction and two domains are arranged in the Y-axis direction. At a boundary position of the four domains PXD, alignment of the liquid crystal molecules is different from all the four domains PXD and the boundary position serves as an alignment boundary portion 25. Each of the alignment films 10E has the alignment boundary portion 25 of a substantially cross shape in plan view. The alignment boundary portion 25 is configured by including a first alignment boundary portion 25A that extends along the X-axis direction and a second alignment boundary portion 25B that extends along the Y-axis direction. Note that, in FIGS. 2 and 9, the alignment boundary portion 25 of the four domains PXD is illustrated by a one dot chain line. The alignment boundary portion 25 tends to be easily a dark portion where a light quantity is locally small, because the alignment state of the liquid crystal molecules is difficult to be appropriately controlled. Note that, in FIG. 9, a region where the dark portion is generated is illustrated with shading. In the present embodiment, the tilt directions of the liquid crystal molecules in the four domains PXD are set so as to be different from each other by an integral multiple of 90 degrees. That is, the tilt direction of the liquid crystal molecules is an upper-left diagonal direction in an upper-right domain PXD illustrated in FIG. 9, the tilt direction of the liquid crystal molecules is a lower-left diagonal direction in an upper-left domain PXD illustrated in FIG. 9, the tilt direction of the liquid crystal molecules is a lower-right diagonal direction in a lower-left domain PXD illustrated in FIG. 9, and the tilt direction of the liquid crystal molecules is an upper-right diagonal direction in a lower-right domain PXD illustrated in FIG. 9. In this manner, the liquid crystal molecules arranged in the respective domains PXD are restricted to be aligned in different directions by the pair of alignment films 10E, so that an even viewing angle characteristic of an image displayed in the liquid crystal panel 10 is achieved and better display performance is thus obtained.

The array substrate 10A constituting the liquid crystal panel 10 according to the present embodiment is provided with a capacitor line 26 as illustrated in FIGS. 2 and 5. The capacitor line 26 extends along the X-axis direction, that is, the longitudinal direction of the pixel electrode 12, and, in other words, extends in parallel to the gate line 13. The capacitor line 26 has a capacitor forming portion 27 overlapped with the pixel electrode 12 with the inter-layer insulating film 22 and the flattening film 23 (insulating film) in between. The capacitor line 26 crosses all of a plurality of pixel electrodes 12 that are arranged along the X-axis direction and form one line, and has a plurality of capacitor forming portions 27 that are overlapped with the respective pixel electrodes 12. The number of capacitor forming portions 27 that one capacitor line 26 has coincides with the number of pixel electrodes 12 arranged in the X-axis direction. A plurality of capacitor lines 26 are arranged in line with an interval of about a transverse dimension of a pixel electrode 12 in the Y-axis direction. The arrangement interval of the capacitor lines 26 is almost equal to an arrangement interval of the gate lines 13 and an arrangement interval of the pixel electrodes 12 in the Y-axis direction. The installation number of capacitor lines 26 coincides with the installation number of gate lines 13 and the number of pixel electrodes 12 arranged in the Y-axis direction. Each of the capacitor lines 26 is kept at a reference potential (for example, which may be the same potential as that of the facing electrode 17 or a potential keeping a specific potential difference from that of the facing electrode 17) and electrostatic capacitance is formed between a pixel electrode 12 overlapped with a capacitor forming portion 27 and a connection portion 28 connected to the pixel electrode 12, so that when the pixel electrode 12 is charged, the potential is kept. Moreover, the capacitor line 26 is formed of the first metal film 18 which is the same as that of the gate line 13. This makes it possible to achieve reduction of manufacturing cost, as compared to a case where the capacitor line is assumed to be formed of a metal film different from that of the gate line 13. Further, both of the gate line 13 and the capacitor line 26 extend along the X-axis direction and have a relationship to cross the source line 14, but are formed of the first metal film 18 in which the gate insulating film 19 is interposed between the first metal film 18 and the source line 14, so that short-circuit with respect to the source line 14 is avoided.

Here, the connection portion 28 that the drain electrode 11C has will be described again. As illustrated in FIG. 2, the drain electrode 11C is arranged so that the connection portion 28 connected to the pixel electrode 12 is overlapped with at least a part of the alignment boundary portion 25. Specifically, the connection portion 28 forms a band shape (line shape) extending along the X-axis direction and having a predetermined width and is arranged so as to be overlapped with the first alignment boundary portion 25A of the alignment boundary portion 25, which extends in parallel to an extension direction (X-axis direction) of the connection portion 28. As described above, the alignment boundary portion 25 tends to be easily the dark portion where the light quantity is locally small, because the alignment state of the liquid crystal molecules is difficult to be appropriately controlled. In particular, a position and a width of the dark portion caused by the alignment boundary portion 25 may vary due to alignment accuracy of the mask used when the surface of the alignment film 10E formed on the array substrate 10A is subjected to a photo alignment process, and when the display region has a part where the width of the dark portion is different, display unevenness tends to be visually recognized easily. When the connection portion 28 is arranged so as to be overlapped with the first alignment boundary portion 25A of the alignment boundary portion 25 as described above, the connection portion 28 makes it difficult to visually recognize the display unevenness caused by the first alignment boundary portion 25A and luminance reduction caused when the connection portion 28 is arranged so as to be overlapped with the pixel electrode 12 is suppressed. Additionally, the connection portion 28 is formed of the second metal film 21 which is the same as that of the source line 14 as illustrated in FIG. 3. This makes it possible to achieve reduction of manufacturing cost, as compared to a case where the connection portion is assumed to be formed of a metal film different from that of the source line 14. As illustrated in FIG. 2, in the connection portion 28, a length in the extension direction of the connection portion 28 is equal to the longitudinal dimension of the pixel electrode 12 and a length of the first alignment boundary portion 25A. Accordingly, the connection portion 28 is arranged so as to be overlapped with the first alignment boundary portion 25A over an almost entire length. The connection portion 28 is arranged so as to be overlapped with a center portion of the pixel electrode 12 in the Y-axis direction and is arranged so as to be overlapped with the pixel electrode 12 with the inter-layer insulating film 22 and the flattening film 23 interposed therebetween as illustrated in FIG. 3.

The connection portion 28 has a connection electrode 29 connected to a part of the pixel electrode 12 as illustrated in FIGS. 2 and 3. The connection electrode 29 is arranged at a center position of the connection portion 28 in the X-axis direction. The inter-layer insulating film 22 and the flattening film 23 that are interposed between the connection electrode 29 and the pixel electrode 12 have the contact hole CH formed so as to be opened at a position overlapping with the connection electrode 29 and the pixel electrode 12. The connection electrode 29 and the contact hole CH are arranged at a center position of the pixel electrode 12 in the X-axis direction and the Y-axis direction, in other words, a crossing position of the first alignment boundary portion 25A and the second alignment boundary portion 25B that constitute the alignment boundary portion 25. Around the contact hole CH by which the connection portion 28 and a part of the pixel electrode 12 are connected, alignment of the liquid crystal molecules included in the liquid crystal layer 10C is easily disturbed so that a degree of contribution to display tends to be originally low. Meanwhile, at a crossing position of the first alignment boundary portion 25A and the second alignment boundary portion 25B in the alignment boundary portion 25, the alignment state of the liquid crystal molecules tends to be particularly difficult to be controlled appropriately. On the other hand, since the connection electrode 29 is arranged at the crossing position of the first alignment boundary portion 25A and the second alignment boundary portion 25B, as compared to a case where the connection electrode is assumed to be arranged so as to be offset from the crossing position of the first alignment boundary portion 25A and the second alignment boundary portion 25B, a wide range effectively used for display in the pixel electrode 12 is ensured. Thereby, excellent display quality is kept.

In a part of the connection portion 28 configured as described above, a part of the capacitor forming portion 27 is arranged so as to be overlapped therewith as illustrated in FIGS. 2 and 5. The capacitor forming portion 27 forms a band shape (line shape) extending along the X-axis direction that is the extension direction of the connection portion 28 and having a predetermined width. Similarly to the connection portion 28, the capacitor forming portion 27 is arranged so as to be overlapped with at least a part of the alignment boundary portion 25, specifically, the first alignment boundary portion 25A. Similarly to the connection portion 28, the capacitor forming portion 27 is arranged so as to be overlapped with the first alignment boundary portion 25A over an almost entire length. Similarly to the connection portion 28, the capacitor forming portion 27 is arranged so as to be overlapped with a center portion of the pixel electrode 12 in the Y-axis direction and is arranged so as to be overlapped with the pixel electrode 12 with the gate insulating film 19, the inter-layer insulating film 22, the flattening film 23, and a part of the connection portion 28 in between. Note that, in the present embodiment, the X-axis direction is "the extension direction of the capacitor forming portion 27 and the connection portion 28" and the Y-axis direction is "a crossing direction that crosses the extension direction of the capacitor forming portion 27 and the connection portion 28".

Figure 10:
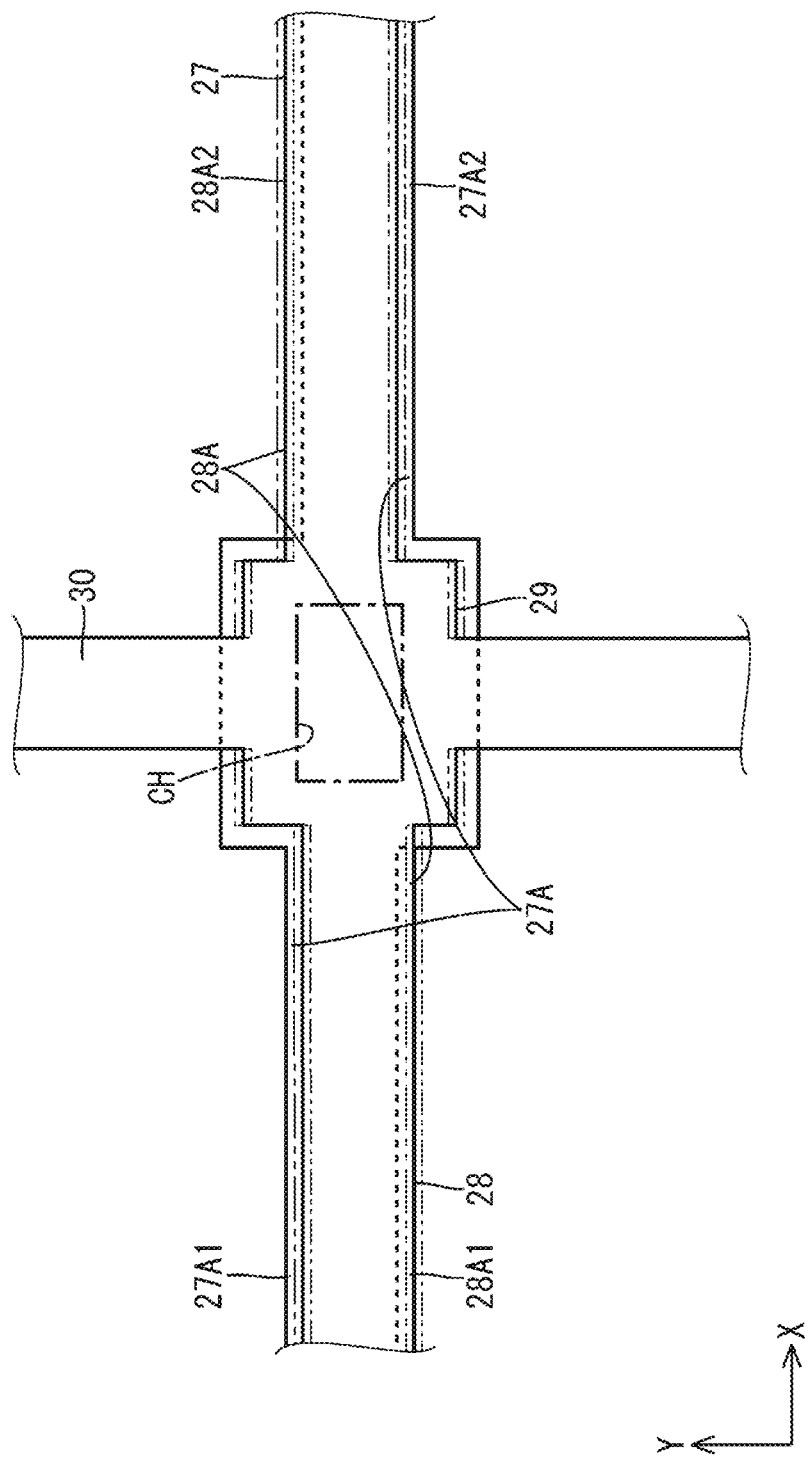
FIG. 10 is a plan view in which a vicinity of a connection portion and a capacitor forming portion in the array substrate is enlarged.

The capacitor forming portion 27 is arranged so as to be partially offset from the connection portion 28 in the Y-axis direction as illustrated in FIGS. 5, 6, and 10. FIG. 10 is a plan view in which a vicinity of the capacitor forming portion 27 and the connection portion 28 in the array substrate 10A is enlarged. Thus, the capacitor forming portion 27 and the connection portion 28 have respective overlapping portions in which the capacitor forming portion 27 and the connection portion 28 are overlapped with each other, and respectively have non-overlapping portions 27A and 28A in which the capacitor forming portion 27 and the connection portion 28 are not overlapped with each other. The non-overlapping portions 27A and 28A respectively include a non-overlapping portion on a capacitor forming portion side 27A as a part of the capacitor forming portion 27 and a non-overlapping portion on a connection portion side 28A as a part of the connection portion 28. The non-overlapping portion on the capacitor forming portion side 27A and the non-overlapping portion on the connection portion side 28A are respectively formed of side edges of the capacitor forming portion 27 and the connection portion 28, which extend along the X-axis direction. The non-overlapping portion on the capacitor forming portion side 27A and the non-overlapping portion on the connection portion side 28A are arranged so as to hold the overlapping portions of the capacitor forming portion 27 and the connection portion 28 therebetween in the Y-axis direction. That is, one of the non-overlapping portion on the capacitor forming portion side 27A and the non-overlapping portion on the connection portion side 28A is arranged on one side of corresponding one of the overlapping portions described above in the Y-axis direction and the other is arranged on the other side of corresponding one of the overlapping portions described above in the Y-axis direction. The non-overlapping portion on the capacitor forming portion side 27A and the non-overlapping portion on the connection portion side 28A are generated when the capacitor forming portion 27 and the connection portion 28 are provided at positions according to design, and when the capacitor forming portion 27 and the connection portion 28 are shifted in the Y-axis direction from the designed positions at a time of actual manufacturing, the non-overlapping portions can be partially overlapped with the capacitor forming portion 27 and the connection portion 28. Similarly, in a case where the overlapping portions that are overlapped when the capacitor forming portion 27 and the connection portion 28 are provided at the positions according to design are shifted in the Y-axis direction as described above, the overlapping portions cannot be partially overlapped with the capacitor forming portion 27 and the connection portion 28.

As illustrated in FIGS. 5, 6, and 10, the non-overlapping portion on the capacitor forming portion side 27A and the non-overlapping portion on the connection portion side 28A are arranged so as to be switched in arrangement in the Y-axis direction between one side and the other side in the X-axis direction in the capacitor forming portion 27 and the connection portion 28. Specifically, the non-overlapping portion on the capacitor forming portion side 27A and the non-overlapping portion on the connection portion side 28A are switched in vertical arrangement illustrated in FIG. 10 in the Y-axis direction between a left side and a right side illustrated in FIG. 10 with a center position in the X-axis direction as a boundary in the connection portion 28 and the boundary forming portion 27. Note that, hereinafter, in a case where the non-overlapping portion on the capacitor forming portion side 27A and the non-overlapping portion on the connection portion side 28A are distinguished, ones arranged on the left side illustrated in FIG. 10 are indicated as "a first non-overlapping portion on the capacitor forming portion side 27A1 and a first non-overlapping portion on the connection portion side 28A1" by using reference signs each with a suffix of "1" and ones arranged on the right side illustrated in FIG. 10 are indicated as "a second non-overlapping portion on the capacitor forming portion side 27A2 and a second non-overlapping portion on the connection portion side 28A2" by using reference signs each with a suffix of "2", and in a case where they are not distinguished and collectively referred to, no suffix is added to a reference sign. Specifically, while the first non-overlapping portion on the capacitor forming portion side 27A1 is shifted to the upper side illustrated in FIG. 10 in the Y-axis direction with respect to the connection portion 28, the first non-overlapping portion on the connection portion side 28A1 is shifted to the lower side illustrated in FIG. 10 in the Y-axis direction with respect to the capacitor forming portion 27. While the second non-overlapping portion on the capacitor forming portion side 27A2 is shifted to the lower side illustrated in FIG. 10 in the Y-axis direction with respect to the connection portion 28, the second non-overlapping portion on the connection portion side 28A2 is shifted to the upper side illustrated in FIG. 10 in the Y-axis direction with respect to the capacitor forming portion 27. The first non-overlapping portion on the capacitor forming portion side 27A1 and the second non-overlapping portion on the capacitor forming portion side 27A2 are shifted to mutually opposite sides in the Y-axis direction with respect to the connection portion 28. The first non-overlapping portion on the connection portion side 28A1 and the second non-overlapping portion on the connection portion side 28A2 are shifted to mutually opposite sides in the Y-axis direction with respect to the capacitor forming portion 27.

According to the foregoing configuration, as illustrated in FIG. 10, even when an area where the capacitor forming portion 27 and the connection portion 28 are overlapped is increased or reduced on one side in the X-axis direction in accordance with the positional shift of the capacitor forming portion 27 and the connection portion 28 in the Y-axis direction from the designed positions for a manufacturing reason, an area where the capacitor forming portion 27 and the connection portion 28 are overlapped is reduced or increased on the other side in the extension direction. Note that, in FIG. 10, a state where the connection portion 28 is shifted in the Y-axis direction from the designed position is illustrated by a two dot chain line. For example, in a case where the connection portion 28 is shifted from the designed position with respect to the capacitor forming portion 27 to the upper side in the Y-axis direction, widths of the first non-overlapping portion on the capacitor forming portion side 27A1 and the first non-overlapping portion on the connection portion side 28A1 are reduced and widths of the overlapping portions are increased in a left-side portion illustrated in FIG. 10 in the X-axis direction in the capacitor forming portion 27 and the connection portion 28. On the other hand, widths of the second non-overlapping portion on the capacitor forming portion side 27A2 and the second non-overlapping portion on the connection portion side 28A2 are increased and widths of the overlapping portions are reduced in a right-side portion illustrated in FIG. 10 in the X-axis direction in the capacitor forming portion 27 and the connection portion 28. Contrary to the above, in a case where the connection portion 28 is shifted from the designed position with respect to the capacitor forming portion 27 to the lower side in the Y-axis direction, widths of the first non-overlapping portion on the capacitor forming portion side 27A1 and the first non-overlapping portion on the connection portion side 28A1 are increased and widths of the overlapping portions are reduced in the left-side portion illustrated in FIG. 10 in the X-axis direction in the capacitor forming portion 27 and the connection portion 28. On the other hand, widths of the second non-overlapping portion on the capacitor forming portion side 27A2 and the second non-overlapping portion on the connection portion side 28A2 are reduced and widths of the overlapping portions are increased in the right-side portion illustrated in FIG. 10 in the X-axis direction in the capacitor forming portion 27 and the connection portion 28. Accordingly, even when the capacitor forming portion 27 and the connection portion 28 are shifted in the Y-axis direction from the designed positions for a manufacturing reason, a variation of an entire area where the capacitor forming portion 27 and the connection portion 28 are overlapped is avoided. Thereby, a variation of electrostatic capacitance formed between the capacitor forming portion 27 and the connection portion 28 is also avoided. In addition, as compared to a conventional case where an extended portion of a CS bus line has portions protruding from both side edges of an extended portion of a drain extension line, a light shielding range by the capacitor forming portion 27 and the connection portion 28 is narrowed.

As illustrated in FIG. 2, the capacitor forming portion 27 and the connection portion 28 are provided so that dimensions of the non-overlapping portions 27A and 28A in the X-axis direction are equal between one side and the other side in the X-axis direction. Additionally, the capacitor forming portion 27 and the connection portion 28 are provided so that dimensions of the non-overlapping portions 27A and 28A in the Y-axis direction are equal between one side and the other side in the X-axis direction. Specifically, the first non-overlapping portion on the capacitor forming portion side 27A1 and the second non-overlapping portion on the capacitor forming portion side 27A2 are almost equal in length and width. Similarly, the first non-overlapping portion on the connection portion side 28A1 and the second non-overlapping portion on the connection portion side 28A2 are almost equal in length and width. Further, the capacitor forming portion 27 and the connection portion 28 substantially have a rotationally symmetric shape. Specifically, the capacitor forming portion 27 and the connection portion 28 have an almost rotationally symmetric shape as a whole other than a center portion (near the connection electrode 29) in the X-axis direction. According to such a configuration, even when the capacitor forming portion 27 and the connection portion 28 are shifted in the Y-axis direction from the designed positions for a manufacturing reason, the entire area where the capacitor forming portion 27 and the connection portion 28 are overlapped is kept fixed, so that the electrostatic capacitance formed between the capacitor forming portion 27 and the connection portion 28 is also kept fixed. In addition, a positional shift allowable dimension that is allowed when the capacitor forming portion 27 and the connection portion 28 are shifted in the Y-axis direction is equal between one side and the other side in the Y-axis direction.

In the array substrate 10A constituting the liquid crystal panel 10 according to the present embodiment, as illustrated in FIGS. 2 and 4, a light shielding portion 30 that extends along the Y-axis direction and is arranged so as to be overlapped with the second alignment boundary portion 25B of the alignment boundary portion 25 is provided. The light shielding portion 30 is arranged at an almost center position of the pixel electrode 12 in the X-axis direction and is arranged so as to be overlapped with almost the second alignment boundary portion 25B of the alignment boundary portion 25, which extends in the Y-axis direction. Similarly to the first alignment boundary portion 25A, in the second alignment boundary portion 25B, a position and a width of a dark portion that is generated vary due to alignment accuracy of the mask used when the surface of the alignment film 10E formed on the CF substrate 10B is subjected to a photo alignment process, and display unevenness is visually recognized easily. When the light shielding portion 30 is arranged so as to be overlapped with such a second alignment boundary portion 25B, the light shielding portion 30 makes it difficult to visually recognize the display unevenness caused by the second alignment boundary portion 25B and luminance reduction caused when the light shielding portion 30 is arranged so as to be overlapped with the pixel electrode 12 is suppressed. Additionally, the light shielding portion 30 according to the present embodiment is constituted by a first light shielding portion 30A that is formed of the second metal film 21, which is the same as that of the connection portion 28, and that is continued to the connection portion 28. Accordingly, as compared to a case where it is assumed that the first light shielding portion is formed of another metal film (conductor film) in which an insulating film is interposed between the metal film and the connection portion 28 and the light shielding portion and the connection portion 28 are connected by the contact hole that is formed so as to be opened in the insulating film, generation of the dark portion caused by such a contact hole is avoided.

Here, a relationship between an outer periphery of the pixel electrode 12 and a tilt direction of liquid crystal molecules near the middle of the liquid crystal layer 10C in the thickness direction will be described in detail with reference to FIG. 9. As illustrated in FIG. 9, the outer periphery of the pixel electrode 12 forms respective two outer sides of four domains PXD of the pixel portions PX other than respective two sides thereof facing the alignment boundary portion 25. On the other hand, tilt directions of the liquid crystal molecules included in the liquid crystal layer 10C are different from each other by an integral multiple of 90 degrees in the respective domains PXD as described above. Thus, in the upper-right domain PXD illustrated in FIG. 9, an azimuthal direction that is perpendicular to a short-side edge 12S of the pixel electrode 12 and points toward an inside of the pixel electrode 12 defines an acute angle (angle not exceeding 90 degrees) with respect to the tilt direction of the liquid crystal molecules, whereas an azimuthal direction that is perpendicular to a long-side edge 12L of the pixel electrode 12 and points toward the inside of the pixel electrode 12 defines an obtuse angle (angle exceeding 90 degrees) with respect to the tilt direction of the liquid crystal molecules. Similarly, in the upper-left domain PXD illustrated in FIG. 9, an azimuthal direction that is perpendicular to the short-side edge 12S of the pixel electrode 12 and points toward the inside of the pixel electrode 12 defines an obtuse angle with respect to the tilt direction of the liquid crystal molecules, whereas an azimuthal direction that is perpendicular to the long-side edge 12L of the pixel electrode 12 and points toward the inside of the pixel electrode 12 defines an acute angle with respect to the tilt direction of the liquid crystal molecules. Similarly, in the lower-left domain PXD illustrated in FIG. 9, an azimuthal direction that is perpendicular to the short-side edge 12S of the pixel electrode 12 and points toward the inside of the pixel electrode 12 defines an acute angle with respect to the tilt direction of the liquid crystal molecules, whereas an azimuthal direction that is perpendicular to the long-side edge 12L of the pixel electrode 12 and points toward the inside of the pixel electrode 12 defines an obtuse angle with respect to the tilt direction of the liquid crystal molecules. In the lower-right domain PXD illustrated in FIG. 9, an azimuthal direction that is perpendicular to the short-side edge 12S of the pixel electrode 12 and points toward the inside of the pixel electrode 12 defines an obtuse angle with respect to the tilt direction of the liquid crystal molecules, whereas an azimuthal direction that is perpendicular to the long-side edge 12L of the pixel electrode 12 and points toward the inside of the pixel electrode 12 defines an acute angle with respect to the tilt direction of the liquid crystal molecules. Meanwhile, near the outer periphery of the pixel electrode 12, an electric field generated between the gate line 13 or the source line 14 and the pixel electrode 12 exists, and the electric field can apply alignment restriction force to the liquid crystal molecules included in the liquid crystal layer 10C. An electric field generated near an edge which is included in the outer periphery of the pixel electrode 12 and in which an azimuthal direction that is perpendicular to the edge and points toward the inside of the pixel electrode 12 defines an obtuse angle with respect to the tilt direction of the liquid crystal molecules applies alignment restriction force in a direction opposite to the tilt direction described above to the liquid crystal molecules, so that alignment of the liquid crystal molecules is easily disturbed near the edge and a dark portion may be visually recognized. In particular, the dark portion caused by the disturbed alignment of the liquid crystal molecules described above can slightly vary in width in accordance with intensity of the electric field generated near the edge which is included in the outer periphery of the pixel electrode 12 and in which the azimuthal direction that is perpendicular to the edge and points toward the inside of the pixel electrode 12 defines the obtuse angle with respect to the tilt direction of the liquid crystal molecules. The intensity of the electric field described above varies in accordance with a distance between the edge of the pixel electrode 12 and a side edge of the gate line 13 or the source line 14, a film thickness of the inter-layer insulating film 22 or the flattening film 23, or the like. Thus, when the display region has a part where the width of the dark portion is different, display unevenness tends to be visually recognized easily.

Thus, as illustrated in FIGS. 2, 5, and 6, the array substrate 10A constituting the liquid crystal panel 10 according to the present embodiment is provided with an edge light shielding portion 31 that is arranged so as to be overlapped with at least a part of an edge which is included in the outer periphery of the pixel electrode 12 and in which an azimuthal direction that is perpendicular to the edge and points toward the inside of the pixel electrode 12 defines an obtuse angle with respect to the tilt direction of the liquid crystal molecules near the middle of the liquid crystal layer 10C in the thickness direction when a voltage is applied to the liquid crystal layer 10C. The edge light shielding portion 31 is arranged so as to be overlapped with at least a part of the long-side edge 12L which is included in the outer periphery of the pixel electrode 12 and in which an azimuthal direction that is perpendicular to the edge and points toward the inside of the pixel electrode 12 defines an obtuse angle with respect to the tilt direction. Specifically, two edge light shielding portions 31 are arranged so as to be overlapped with the long-side edge 12L of the pixel electrode 12 in the upper-right domain PXD illustrated in FIG. 2 and the long-side edge 12L of the pixel electrode 12 in the lower-left domain PXD illustrated in FIG. 2. Each of the edge light shielding portions 31 extends along the X-axis direction and is overlapped with an almost entire region of each of long-side edges 12L of the pixel electrode 12 described above. According to such a configuration, even in a case where alignment of the liquid crystal molecules is disturbed due to alignment restriction force applied to the liquid crystal molecules by the electric field generated between the gate line 13 and the long-side edge 12L which is included in the outer periphery of the pixel electrode 12 and in which the azimuthal direction that is perpendicular to the edge and points toward the inside of the pixel electrode 12 defines the obtuse angle with respect to the tilt direction of the liquid crystal molecules, the edge light shielding portion 31 arranged so as to be overlapped with the long-side edge 12L in which the azimuthal direction described above defines the obtuse angle with respect to the tilt direction of the liquid crystal molecules described above makes it difficult to visually recognize the dark portion caused by the disturbed alignment. As a result, even when the display region has a part where the width of the dark portion is different, display unevenness is less likely to be visually recognized and excellent display quality is kept. Additionally, the long-side edge 12L in which the azimuthal direction described above defines the obtuse angle with respect to the tilt direction of the liquid crystal molecules described above is formed in a wider range than the short-side edge 12S and tends to also have a wider range where the dark portion is generated, but when the edge light shielding portion 31 is arranged so as to be overlapped with the long-side edge 12L, the dark portion that can be generated over a wide range near the long-side edge 12L is less likely to be visually recognized. Thereby, excellent display quality is kept. Note that, the edge light shielding portion 31 is not arranged so as to be overlapped with each of short-side edges 12S in the upper-left domain PXD and the lower-right domain PXD illustrated in FIG. 2, but the edge 12S has a relatively narrower range where the dark portion can be generated than the long-side edge 12L, so that display quality is not considerably deteriorated. Moreover, also in a case where display quality is improved by hiding the dark portion with the black matrix 16, each of the short-side edges 12S has a relatively narrower range where the dark portion can be generated than the long-side edge 12L, so that an influence on reduction of luminance is small.

As illustrated in FIGS. 2, 5, and 6, the edge light shielding portion 31 is formed of the second metal film 21, which is the same as that of the connection portion 28, and is continued to the connection portion 28. The edge light shielding portion 31 is directly continued to the first light shielding portion 30A constituting the light shielding portion 30 and is indirectly continued to the connection portion 28 through the first light shielding portion 30A. The edge light shielding portion 31 is electrically connected to the connection portion 28 and is thus able to shield the electric field generated near the long-side edge 12L which is included in the outer periphery of the pixel electrode 12 and in which the azimuthal direction that is perpendicular to the edge and points toward the inside of the pixel electrode 12 defines the obtuse angle with respect to the tilt direction described above. Thereby, disturbed alignment of the liquid crystal molecules is difficult to be generated near the long-side edge 12L in which the azimuthal direction described above defines the obtuse angle with respect to the tilt direction described above, so that the dark portion is less likely to be visually recognized, which contributes to improvement of display quality. Moreover, as compared to a case where it is assumed that the edge light shielding portion is formed of another metal film (conductor film) in which an insulating film is interposed between the metal film and the connection portion 28 and the edge light shielding portion and the connection portion 28 are connected by the contact hole that is formed so as to be opened in the insulating film, generation of the dark portion caused by such a contact hole is avoided.

As illustrated in FIGS. 2, 5, and 6, the edge light shielding portion 31 is arranged so as not to be overlapped with the gate line 13 but so as to be adjacent to a side edge 13E of the gate line 13. Thereby, an electric field that can be generated between the side edge 13E of the gate line 13 and the long-side edge 12L of the pixel electrode 12 is able to be shielded by the edge light shielding portion 31 that is arranged so as to be adjacent to the side edge 13E of the gate line 13. Accordingly, disturbed alignment of the liquid crystal molecules is more difficult to be generated near the long-side edge 12L in which the azimuthal direction described above defines the obtuse angle with respect to the tilt direction described above, so that the dark portion is much less likely to be visually recognized, which contributes to improvement of display quality. Further, since the edge light shielding portion 31 is arranged so as not to be overlapped with the gate line 13, parasitic capacitance that can be generated between the gate line 13 and the connection portion 28 is suppressed.

As described above, the liquid crystal panel (display apparatus) 10 of the present embodiment includes the liquid crystal layer 10C that includes the liquid crystal molecules, a plurality of domains PXD that are different in alignment direction of the liquid crystal molecules when a voltage is applied to the liquid crystal layer 10C, the alignment boundary portion 25 that is positioned in a boundary of the plurality of domains PXD, the alignment film 10E that aligns the liquid crystal molecules, the pixel electrode 12, the connection portion 28 that is connected to the pixel electrode 12 and arranged so as to be overlapped with at least a part of the alignment boundary portion 25, and the capacitor forming portion 27 that is arranged so as to be partially overlapped with a part of the connection portion 28 with the gate insulating film (insulating film) 19 in between and forms electrostatic capacitance between the capacitor forming portion 27 and the connection portion 28. Both the connection portion 28 and the capacitor forming portion 27 extend along at least a part of the alignment boundary portion 25, respectively have the non-overlapping portions 27A and 28A in which the connection portion 28 and the capacitor forming portion 27 are not overlapped with each other in a crossing direction that crosses an extension direction of the connection portion 28 and the capacitor forming portion 27, and are provided so that arrangement of the non-overlapping portions 27A and 28A in the crossing direction is switched between one side and the other side in the extension direction.

As a result, a part of the capacitor forming portion 27 is arranged so as to be overlapped with a part of the connection portion 28 connected to the pixel electrode 12 with the gate insulating film 19 in between, so that the electrostatic capacitance is formed between the connection portion 28 and the capacitor forming portion 27. Thereby, a potential of the pixel electrode 12 is kept. The connection portion 28 is arranged so as to be overlapped with at least a part of the alignment boundary portion 25 positioned in the boundary of the plurality of domains PXD that are different in alignment direction of the liquid crystal molecules included in the liquid crystal layer 10C. The alignment boundary portion 25 tends to be easily the dark portion where the light quantity is locally small, because the alignment state of the liquid crystal molecules is difficult to be appropriately controlled. When the connection portion 28 is arranged so as to be overlapped with at least a part of the alignment boundary portion 25 as described above, the connection portion 28 makes it difficult to visually recognize display unevenness caused by a variation of a width or the like of the dark portion generated near the alignment boundary portion 25.

Meanwhile, both the connection portion 28 and the capacitor forming portion 27 extend along at least a part of the alignment boundary portion 25, and respectively have the non-overlapping portions 27A and 28A in which the connection portion 28 and the capacitor forming portion 27 are not overlapped with each other in the crossing direction that crosses the extension direction of the connection portion 28 and the capacitor forming portion 27. The non-overlapping portions 27A and 28A are generated when the connection portion 28 and the capacitor forming portion 27 are provided at positions according to design, and when the connection portion 28 and the capacitor forming portion 27 are shifted in the crossing direction from the designed positions, the non-overlapping portions can be partially overlapped with the connection portion 28 and the capacitor forming portion 27. Similarly, in a case where portions in which the connection portion 28 and the capacitor forming portion 27 are overlapped with each other when the connection portion 28 and the capacitor forming portion 27 are provided at the positions according to design are shifted in the crossing direction as described above, the overlapping portions cannot be partially overlapped with the connection portion 28 and the capacitor forming portion 27. Since the connection portion 28 and the capacitor forming portion 27 are provided so that arrangement of the non-overlapping portions 27A and 28A in the crossing direction is switched between one side and the other side in the extension direction, even when an area where the connection portion 28 and the capacitor forming portion 27 are overlapped is increased or reduced on one side in the extension direction in accordance with generation of the positional shift in the crossing direction as described above, an area where the connection portion 28 and the capacitor forming portion 27 are overlapped is reduced or increased on the other side in the extension direction. Thus, even when the positional shift in the crossing direction as described above is generated, the entire area where the connection portion 28 and the capacitor forming portion 27 are overlapped is difficult to vary, so that the electrostatic capacitance formed between the connection portion 28 and the capacitor forming portion 27 is also difficult to vary. Moreover, as compared to a conventional case where an extended portion of a CS bus line has portions protruding from both side edges of an extended portion of a drain extension line, a light shielding range by the connection portion 28 and the capacitor forming portion 27 is narrowed.

Moreover, the connection portion 28 and the capacitor forming portion 27 may be provided so that dimensions of the non-overlapping portions 27A and 28A in the extension direction are equal between one side and the other side in the extension direction. As a result, when the connection portion 28 and the capacitor forming portion 27 are shifted in the crossing direction as described above, an amount of an increase or reduction in the area where the connection portion 28 and the capacitor forming portion 27 are overlapped is equal between one side and the other side in the extension direction. Thus, even when the positional shift in the crossing direction as described above is generated, the entire area where the connection portion 28 and the capacitor forming portion 27 are overlapped is kept fixed, so that the electrostatic capacitance formed between the connection portion 28 and the capacitor forming portion 27 is also kept fixed.

Moreover, the connection portion 28 and the capacitor forming portion 27 may be provided so that the dimensions of the non-overlapping portions 27A and 28A in the crossing direction are equal between one side and the other side in the extension direction. As a result, a positional shift allowable dimension that is allowed when the connection portion 28 and the capacitor forming portion 27 are shifted in the crossing direction as described above is equal between one side and the other side in the crossing direction.

Moreover, the connection portion 28 and the capacitor forming portion 27 may substantially have a rotationally symmetric shape. As a result, in the connection portion 28 and the capacitor forming portion 27, the dimensions of the non-overlapping portions 27A and 28A in the extension direction are equal between one side and the other side in the extension direction and the dimensions of the non-overlapping portions 27A and 28A in the crossing direction are equal between one side and the other side in the extension direction. Thus, even when the positional shift in the crossing direction as described above is generated, the entire area where the connection portion 28 and the capacitor forming portion 27 are overlapped is kept fixed, so that the electrostatic capacitance formed between the connection portion 28 and the capacitor forming portion 27 is also kept fixed. Additionally, the positional shift allowable dimension that is allowed when the connection portion 28 and the capacitor forming portion 27 are shifted in the crossing direction is equal between one side and the other side in the crossing direction.

Moreover, the pixel electrode 12 may have a longitudinal shape and the connection portion 28 and the capacitor forming portion 27 may be provided so that the extension direction coincides with the longitudinal direction of the pixel electrode 12. As a result, the connection portion 28 is arranged so as to be overlapped with a part of the alignment boundary portion 25, which extends along the longitudinal direction of the pixel electrode 12. Thus, the connection portion 28 is able to make it difficult to visually recognize the dark portion, which is caused by the alignment boundary portion 25, over a wide range.

Moreover, the alignment boundary portion 25 may be configured by including the first alignment boundary portion 25A that extends along the extension direction and is overlapped with the connection portion 28 and the second alignment boundary portion 25B that extends along the crossing direction, and the light shielding portion 30 that extends along the crossing direction and is arranged so as to be overlapped with the second alignment boundary portion 25B may be included. As a result, division into four domains PXD that are different in alignment direction of the liquid crystal molecules is achieved by the first alignment boundary portion 25A that extends along the extension direction of the connection portion 28 and the capacitor forming portion 27 and the second alignment boundary portion 25B that extends along the crossing direction, which is suitable for improvement of a viewing angle characteristic. When the connection portion 28 is arranged so as to be overlapped with the first alignment boundary portion 25A of the alignment boundary portion 25, display unevenness caused by a variation of a width or the like of the dark portion generated near the first alignment boundary portion 25A is less likely to be visually recognized. On the other hand, when the light shielding portion 30 is arranged so as to be overlapped with the second alignment boundary portion 25B, display unevenness caused by a variation of a width or the like of the dark portion generated near the second alignment boundary portion 25B is less likely to be visually recognized. Accordingly, display unevenness caused by the variation of the width or the like of the dark portion generated near the alignment boundary portion 25 is less likely to be visually recognized.

Moreover, the light shielding portion 30 may include the first light shielding portion 30A that is formed of the second metal film (conductor film) 21, which is the same as that of the connection portion 28, and continued to the connection portion 28. As a result, as compared to a case where it is assumed that the first light shielding portion is formed of another conductor film in which an insulating film is interposed between the conductor film and the connection portion 28 and the first light shielding portion and the connection portion 28 are connected by the contact hole that is formed so as to be opened in the insulating film, generation of the dark portion caused by such a contact hole is avoided.

Moreover, the edge light shielding portion 31 that is arranged so as to be overlapped with at least a part of an edge which is included in the outer periphery of the pixel electrode 12 and in which an azimuthal direction that is perpendicular to the edge and points toward the inside of the pixel electrode 12 defines an obtuse angle with respect to the tilt direction of the liquid crystal molecules near the middle of the liquid crystal layer 10C in the thickness direction when a voltage is applied to the liquid crystal layer 10C may be provided. Near the outer periphery of the pixel electrode 12, an electric field generated between the pixel electrode 12 and another conductor exists, and the electric field can apply alignment restriction force to the liquid crystal molecules included in the liquid crystal layer 10C. The outer periphery of the pixel electrode 12 includes the following edge. That is, the edge is an edge in which an azimuthal direction that is perpendicular to the edge and points toward the inside of the pixel electrode 12 defines an obtuse angle with respect to the tilt direction of the liquid crystal molecules near the middle of the liquid crystal layer 10C in the thickness direction when a voltage is applied to the liquid crystal layer 10C. The electric field generated near the edge applies alignment restriction force in a direction opposite to the tilt direction described above to the liquid crystal molecules, so that alignment of the liquid crystal molecules is easily disturbed near the edge. On the other hand, since the edge light shielding portion 31 is arranged so as to be overlapped with at least a part of the edge which is included in the outer periphery of the pixel electrode 12 and in which the azimuthal direction described above defines the obtuse angle with respect to the tilt direction described above, even when alignment of the liquid crystal molecules is disturbed when the alignment restriction force is applied by the electric field described above, display failure caused by the disturbed alignment of the liquid crystal molecules is less likely to be visually recognized. Thereby, excellent display quality is kept.

Moreover, the edge light shielding portion 31 may be formed of the second metal film (conductor film) 21, which is the same as that of the connection portion 28, and continued to the connection portion 28. As a result, the electric field generated near at least a part of the edge which is included in the outer periphery of the pixel electrode 12 and in which the azimuthal direction described above defines the obtuse angle with respect to the tilt direction described above is shielded by the edge light shielding portion 31 continued to the connection portion 28. Thereby, disturbed alignment of the liquid crystal molecules is more difficult to be generated near the edge in which the azimuthal direction described above defines the obtuse angle with respect to the tilt direction, so that display failure is much less likely to be visually recognized, which contributes to improvement of display quality. Moreover, as compared to a case where it is assumed that the edge light shielding portion is formed of another conductor film in which an insulating film is interposed between the conductor film and the connection unit 28 and the edge light shielding portion and the connection portion 28 are connected by the contact hole that is formed so as to be opened in the insulating film, generation of the dark portion caused by such a contact hole is avoided.

Moreover, the alignment boundary portion 25 may be configured by including the first alignment boundary portion 25A that extends along the extension direction and is overlapped with the connection portion 28 and the second alignment boundary portion 25B that extends along the crossing direction. The connection portion 28 may have the connection electrode 29 that is overlapped with a part of the pixel electrode 12 with the inter-layer insulating film 22 and the flattening film 23 (insulating film) in between and is connected to the pixel electrode 12 through the contact hole CH that is formed so as to be opened in the inter-layer insulating film 22 and the flattening film 23, and the connection electrode 29 may be arranged at a crossing position of the first alignment boundary portion 25A and the second alignment boundary portion 25B. As a result, division into four domains PXD that are different in alignment direction of the liquid crystal molecules is achieved by the first alignment boundary portion 25A that extends along the extension direction of the connection portion 28 and the capacitor forming portion 27 and the second alignment boundary portion 25B that extends along the crossing direction, which is suitable for improvement of a viewing angle characteristic. The connection portion 28 has the connection electrode 29 connected to the pixel electrode 12 through the contact hole CH that is formed so as to be opened in the inter-layer insulating film 22 and the flattening film 23 that are interposed between the connection portion 28 and the pixel electrode 12. Here, around the contact hole CH by which the connection portion 28 and a part of the pixel electrode 12 are connected, alignment of the liquid crystal molecules included in the liquid crystal layer 10C is easily disturbed so that a degree of contribution to display tends to be originally low. Meanwhile, at the crossing position of the first alignment boundary portion 25A and the second alignment boundary portion 25B in the alignment boundary portion 25, an alignment state of the liquid crystal molecules tends to be particularly difficult to be controlled appropriately. On the other hand, since the connection electrode 29 is arranged at the crossing position of the first alignment boundary portion 25A and the second alignment boundary portion 25B, as compared to a case where the connection electrode is assumed to be arranged so as to be offset from the crossing position of the first alignment boundary portion 25A and the second alignment boundary portion 25B, a wide range effectively used for display in the pixel electrode 12 is ensured. Thereby, excellent display quality is kept.

Moreover, the TFT 11 that has the connection portion 28, the gate line 13 that extends along the extension direction and is connected to the TFT 11 to transfer a signal by which the TFT 11 is driven, and the source line (image line) 14 that extends along the crossing direction and is connected to the TFT 11 to transfer a signal by which the pixel electrode 12 is charged may be provided. The capacitor forming portion 27 may be formed of the first metal film (conductor film) 18 which is the same as that of the gate line 13, and the connection portion 28 may be formed of the second metal film (conductor film) 21 which is the same as that of the source line 14. Since the gate line 13 extends along the extension direction of the capacitor forming portion 27, even when the gate line 13 and the capacitor forming portion 27 are formed of the same first metal film 18, short-circuit is avoided. On the other hand, though the source line 14 extends along the crossing direction that crosses the extension direction of the connection portion 28, a range where the connection portion 28 is formed is limited, so that even when the source line 14 and the connection portion 28 are formed of the same second metal film 21, short-circuit is avoided. In this manner, the capacitor forming portion 27 and the gate line 13 are formed of the same first metal film 18 and the connection portion 28 and the source line 14 are formed of the same second metal film 21, which is suitable for achieving reduction of manufacturing cost.

Moreover, the alignment film 10E is subjected to a plurality of alignment processes to differentiate alignment directions of the liquid crystal molecules, and a boundary of portions subjected to the plurality of alignment processes corresponds to the alignment boundary portion 25. When the alignment film 10E is subjected to an alignment process, the liquid crystal molecules are aligned in a specific direction by a portion subjected to the alignment process. The alignment film 10E is subjected to a plurality of alignment processes so that the alignment directions of the liquid crystal molecules are differentiated, and there is a corresponding relationship between a boundary of portions subjected to the plurality of alignment processes and a boundary of a plurality of domains PXD.

Embodiment 2

Embodiment 2 of the disclosure will be described with reference to FIG. 11. Embodiment 2 does not include the edge light shielding portion 31 described in Embodiment 1 described above. Note that, redundant description for a structure, an action, and an effect similar to those of Embodiment 1 described above will be omitted.

Figure 11:
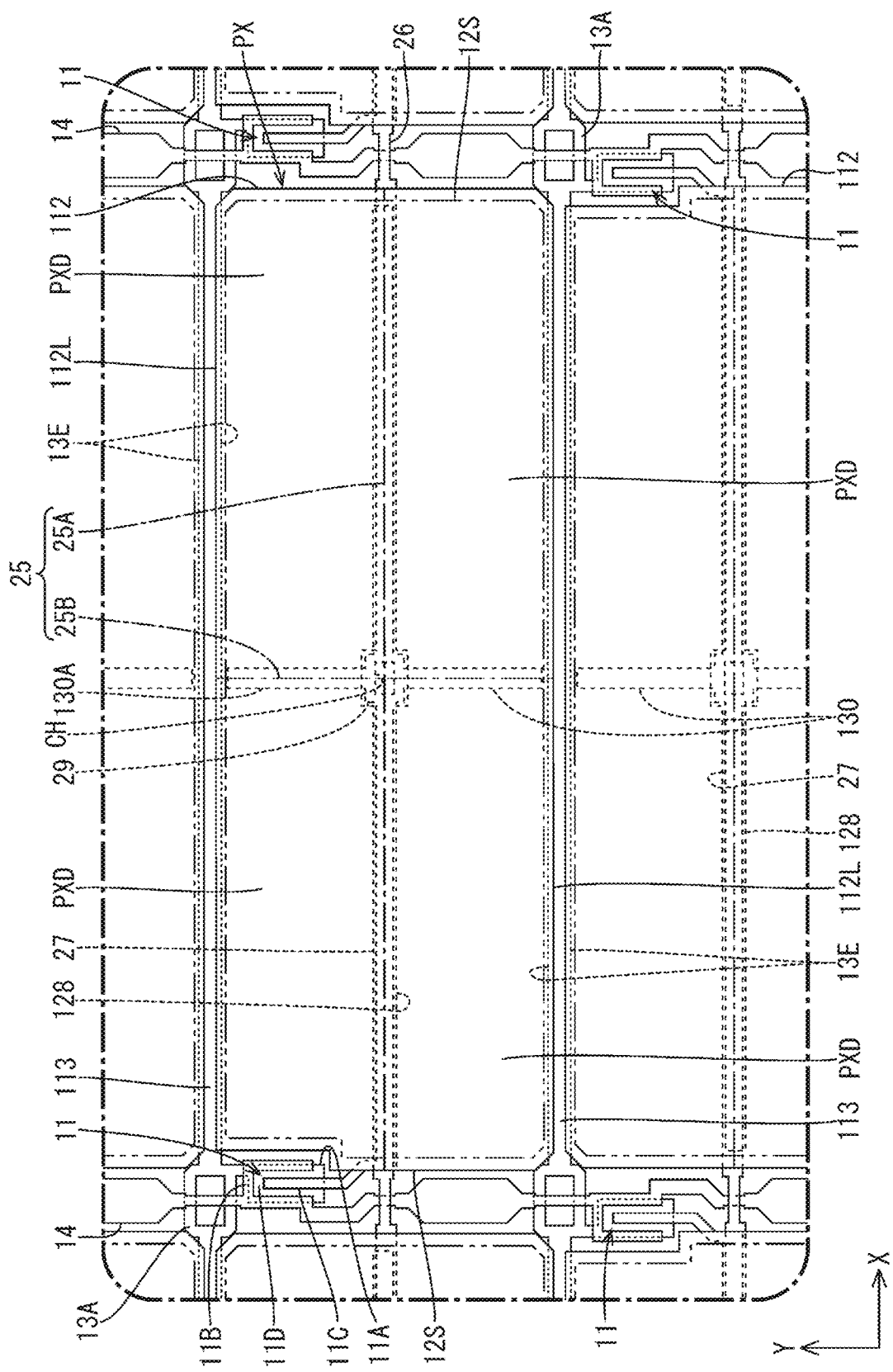
FIG. 11 is a plan view illustrating a pixel array in an array substrate constituting a liquid crystal panel according to Embodiment 2 of the disclosure.

A connection portion 128 according to the present embodiment is continued to a first light shielding portion 130A that constitutes a light shielding portion 130 as illustrated in FIG. 11, but does not include the edge light shielding portion 31 described in Embodiment 1 described above and is not connected. In a case where the edge light shielding portion 31 is not formed, when alignment of the liquid crystal molecules is disturbed due to alignment restriction force applied to the liquid crystal molecules by an electric field generated between a gate line 113 and a long-side edge 112L which is included in an outer periphery of a pixel electrode 112 and in which an azimuthal direction that is perpendicular to the edge and points toward an inside of the pixel electrode 112 defines an obtuse angle with respect to the tilt direction of the liquid crystal molecules near the middle of the liquid crystal layer in the thickness direction when a voltage is applied to the liquid crystal layer, a dark portion caused by the disturbed alignment is visually recognized easily. On the other hand, a light shielding structure overlapped with the pixel electrode 112 is reduced, so that a quantity of light transmission of the pixel electrode 112 is increased, which is suitable for improvement of luminance.

Embodiment 3

Embodiment 3 of the disclosure will be described with reference to FIG. 12 or 13. Embodiment 3 includes a light shielding portion 230 whose configuration is changed from that of Embodiment 2 described above. Note that, redundant description for a structure, an action, and an effect similar to those of Embodiment 2 described above will be omitted.

Figure 12:
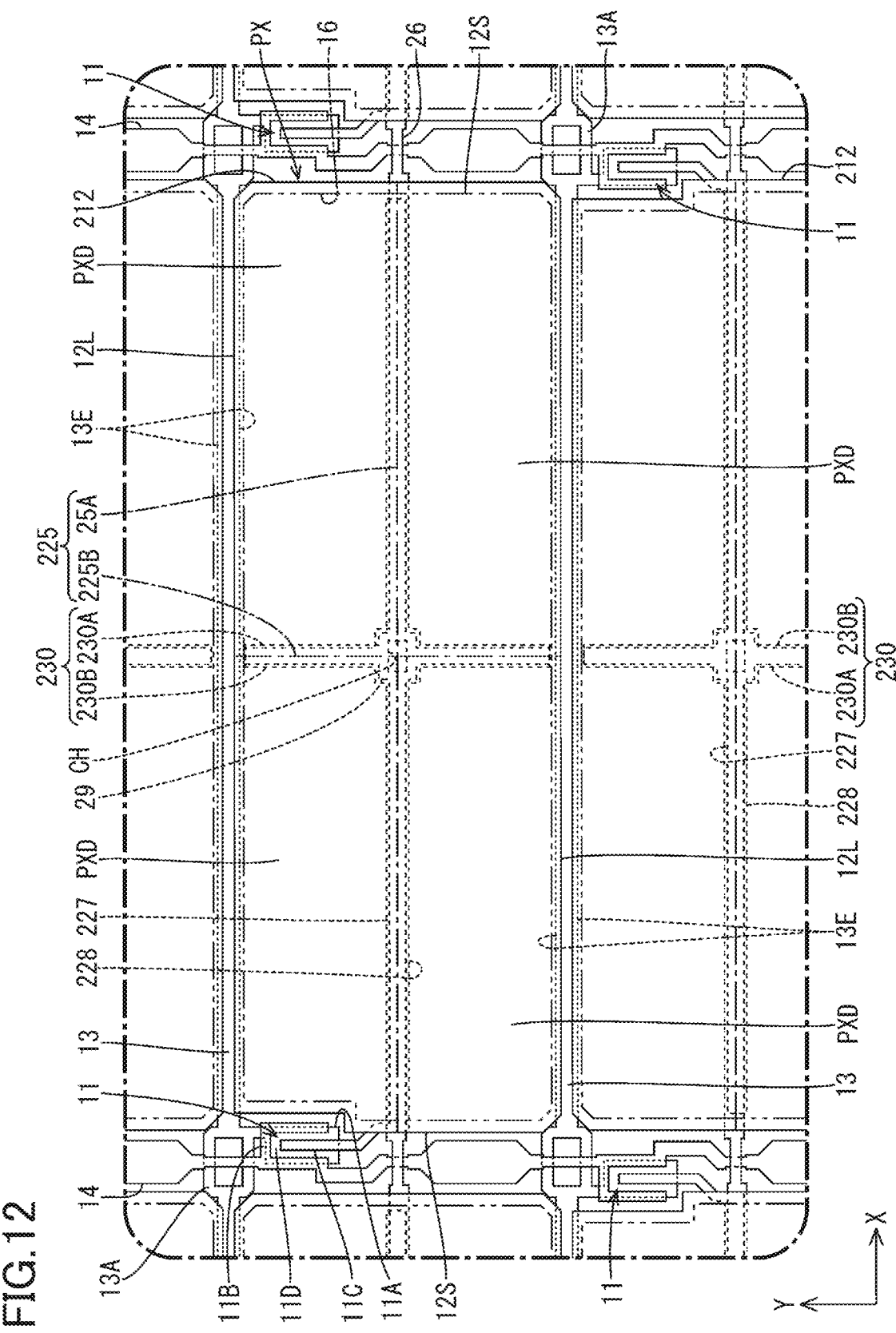
FIG. 12 is a plan view illustrating a pixel array in an array substrate constituting a liquid crystal panel according to Embodiment 3 of the disclosure.

As illustrated in FIG. 12, the light shielding portion 230 according to the present embodiment includes, in addition to the first light shielding portion 30A described in Embodiment 1 described above, a second light shielding portion 230B that is formed of a first metal film (conductor film) 218, which is the same as that of a capacitor forming portion 227, and is continued to the capacitor forming portion 227. The second light shielding portion 230B extends along the Y-axis direction, which is an extension direction of a first light shielding portion 230A, and is arranged so as to be overlapped with a second alignment boundary portion 225B of an alignment boundary portion 225. Further, the second light shielding portion 230B is arranged so as to be overlapped with at least a part of the first light shielding portion 230A. As a result, electric capacitance formed between the capacitor forming portion 227 and a connection portion 228 increases. Thereby, a more favorable potential of a pixel electrode 212 is kept. Moreover, as compared to a case where it is assumed that the second light shielding portion is formed of another conductor film, in which an insulating film is interposed between the conductor film and the capacitor forming portion 227, and the second light shielding portion and the capacitor forming portion 227 are connected by the contact hole that is formed so as to be opened in the insulating film, generation of the dark portion caused by such a contact hole is avoided.

Figure 13:
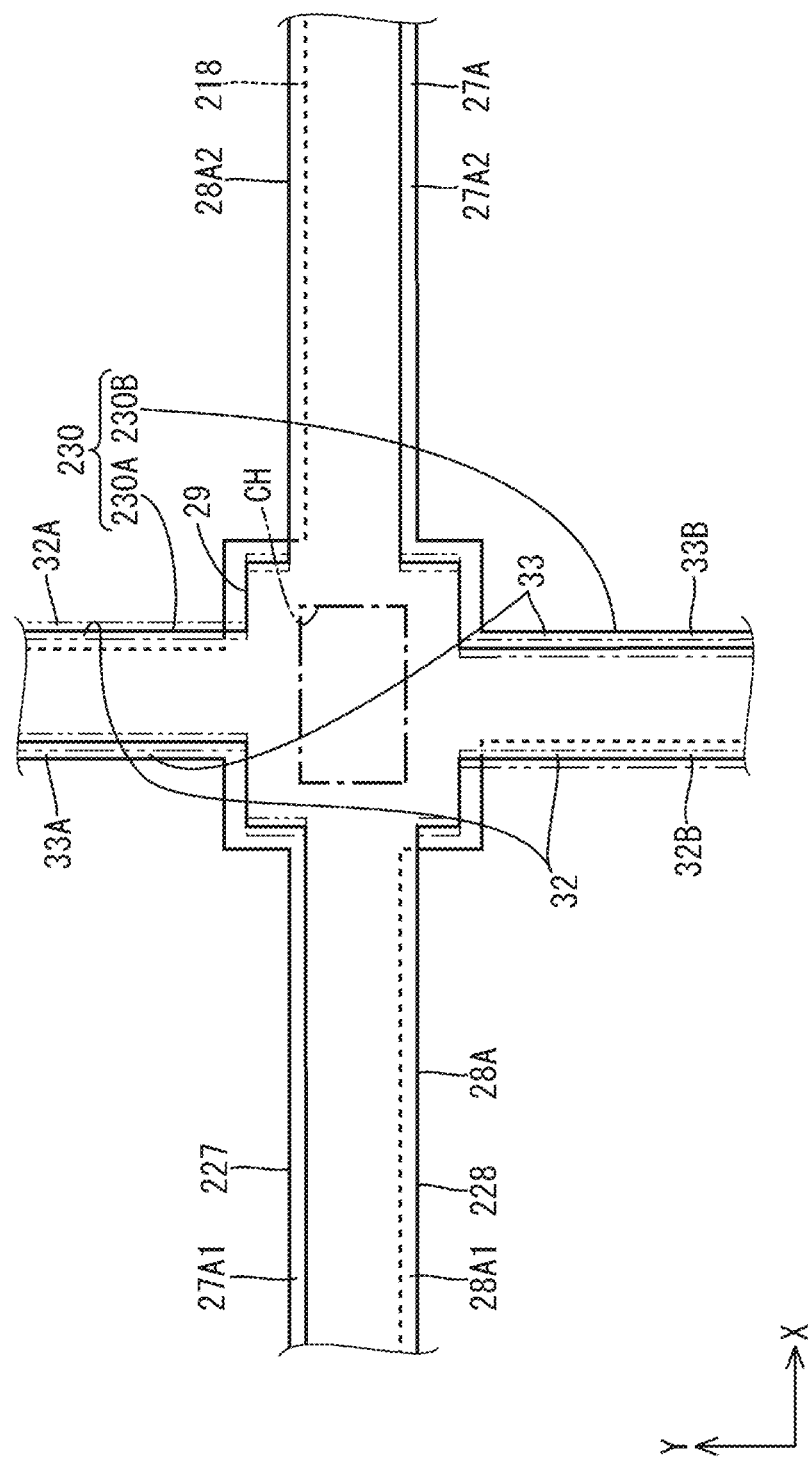
FIG. 13 is a plan view in which a vicinity of a connection portion and a capacitor forming portion in the array substrate is enlarged.

As illustrated in FIG. 13, the second light shielding portion 230B is arranged so as to be partially offset from the first light shielding portion 230A in the X-axis direction. Thus, the first light shielding portion 230A and the second light shielding portion 230B have respective overlapping portions in which the first light shielding portion 230A and the second light shielding portion 230B are overlapped with each other, and respectively have second non-overlapping portions 32 and 33 in which the first light shielding portion 230A and the second light shielding portion 230B are not overlapped with each other. The second non-overlapping portions 32 and 33 include a non-overlapping portion on a first light shielding portion side 32 as a part of the first light shielding portion 230A and a non-overlapping portion on a second light shielding portion side 33 as a part of the second light shielding portion 230B. The non-overlapping portion on the first light shielding portion side 32 and the non-overlapping portion on the second light shielding portion side 33 are respectively formed of side edges which extend along the Y-axis direction in the first light shielding portion 230A and the second light shielding portion 230B. The non-overlapping portion on the first light shielding portion side 32 and the non-overlapping portion on the second light shielding portion side 33 are arranged so as to hold overlapping portions of the first light shielding portion 230A and the second light shielding portion 230B therebetween in the X-axis direction. That is, one of the non-overlapping portion on the first light shielding portion side 32 and the non-overlapping portion on the second light shielding portion side 33 is arranged on one side of corresponding one of the overlapping portions described above in the X-axis direction and the other is arranged on the other side of corresponding one of the overlapping portions described above in the X-axis direction. The non-overlapping portion on the first light shielding portion side 32 and the non-overlapping portion on the second light shielding portion side 33 are generated when the first light shielding portion 230A and the second light shielding portion 230B are provided at positions according to design, and when the first light shielding portion 230A and the second light shielding portion 230B are shifted in the X-axis direction from the designed positions at a time of actual manufacturing, the non-overlapping portions can be partially overlapped with the first light shielding portion 230A and the second light shielding portion 230B. Similarly, in a case where the overlapping portions in which the first light shielding portion 230A and the second light shielding portion 230B are overlapped with each other when the first light shielding portion 230A and the second light shielding portion 230B are provided at the positions according to design are shifted in the X-axis direction as described above, the overlapping portions cannot be partially overlapped with the first light shielding portion 230A and the second light shielding portion 230B.

As illustrated in FIG. 13, the non-overlapping portion on the first light shielding portion side 32 and the non-overlapping portion on the second light shielding portion side 33 are arranged so that arrangement in the X-axis direction is switched between one side and the other side in the Y-axis direction in the first light shielding portion 230A and the second light shielding portion 230B. Specifically, the non-overlapping portion on the first light shielding portion side 32 and the non-overlapping portion on the second light shielding portion side 33 are switched in horizontal arrangement illustrated in FIG. 13 in the X-axis direction between an upper side and a lower side illustrated in FIG. 13 with a center position in the Y-axis direction as a boundary in the first light shielding portion 230A and the second light shielding portion 230B. Note that, hereinafter, in a case where the non-overlapping portion on the first light shielding portion side 32 and the non-overlapping portion on the second light shielding portion side 33 are distinguished, ones arranged on the upper side illustrated in FIG. 13 are indicated as "one non-overlapping portion on the first light shielding portion side 32A and one non-overlapping portion on the second light shielding portion side 33A" by using reference signs each with a suffix of "A" and ones arranged on the lower side illustrated in FIG. 13 are indicated as "the other non-overlapping portion on the first light shielding portion side 32B and the other non-overlapping portion on the second light shielding portion side 33B" by using reference signs each with a suffix of "B", and in a case where they are not distinguished and collectively referred to, no suffix is added to a reference sign. Specifically, while the one non-overlapping portion on the first light shielding portion side 32A is shifted to the right side illustrated in FIG. 13 in the X-axis direction with respect to the second light shielding portion 230B, the one non-overlapping portion on the second light shielding portion side 33A is shifted to the left side illustrated in FIG. 13 in the X-axis direction with respect to the first light shielding portion 230A. While the other non-overlapping portion on the first light shielding portion side 32B is shifted to the left side illustrated in FIG. 13 in the X-axis direction with respect to the second light shielding portion 230B, the other non-overlapping portion on the second light shielding portion side 33B is shifted to the right side illustrated in FIG. 13 in the X-axis direction with respect to the first light shielding portion 230A. The one non-overlapping portion on the first light shielding portion side 32A and the other non-overlapping portion on the second light shielding portion side 33B are shifted to mutually opposite sides in the X-axis direction with respect to the second light shielding portion 230B. The one non-overlapping portion on the second light shielding portion side 33A and the other non-overlapping portion on the second light shielding portion side 33B are shifted to mutually opposite sides in the X-axis direction with respect to the first light shielding portion 230A.

According to the foregoing configuration, as illustrated in FIG. 13, even when an area where the first light shielding portion 230A and the second light shielding portion 230B are overlapped is increased or reduced on one side in the X-axis direction in accordance with the positional shift of the first light shielding portion 230A and the second light shielding portion 230B in the X-axis direction from the designed positions for a manufacturing reason, an area where the first light shielding portion 230A and the second light shielding portion 230B are overlapped is reduced or increased on the other side in the extension direction. Note that, in FIG. 13, a state where the first light shielding portion 230A is shifted in the X-axis direction from the designed position is illustrated by a two dot chain line. For example, in a case where the first light shielding portion 230A is shifted from the designed position with respect to the second light shielding portion 230B to the left side in the X-axis direction, widths of the one non-overlapping portion on the first light shielding portion side 32A and the one non-overlapping portion on the second light shielding portion side 33A are reduced and widths of the overlapping portions are increased in an upper-side portion illustrated in FIG. 13 in the Y-axis direction in the first light shielding portion 230A and the second light shielding portion 230B. On the other hand, widths of the other non-overlapping portion on the first light shielding portion side 32B and the other non-overlapping portion on the second light shielding portion side 33B are increased and widths of the overlapping portions are reduced in a lower-side portion illustrated in FIG. 13 in the Y-axis direction in the first light shielding portion 230A and the second light shielding portion 230B. Contrary to the above, in a case where the first light shielding portion 230A is shifted from the designed position with respect to the second light shielding portion 230B to the right side in the X-axis direction, widths of the one non-overlapping portion on the first light shielding portion side 32A and the one non-overlapping portion on the second light shielding portion side 33A are increased and widths of the overlapping portions are reduced in the upper-side portion illustrated in FIG. 13 in the Y-axis direction in the first light shielding portion 230A and the second light shielding portion 230B. On the other hand, widths of the other non-overlapping portion on the first light shielding portion side 32B and the other non-overlapping portion on the second light shielding portion side 33B are reduced and widths of the overlapping portions are increased in the lower-side portion illustrated in FIG. 13 in the Y-axis direction in the first light shielding portion 230A and the second light shielding portion 230B. Accordingly, even when the first light shielding portion 230A and the second light shielding portion 230B are shifted in the X-axis direction from the designed positions for a manufacturing reason, a variation of an entire area where the first light shielding portion 230A and the second light shielding portion 230B are overlapped is avoided. Thereby, a variation of electrostatic capacitance formed between the first light shielding portion 230A and the second light shielding portion 230B is also avoided.

As described above, according to the present embodiment, the light shielding portion 230 includes the second light shielding portion 230B that is formed of the first metal film (conductor film) 218, which is the same as that of the capacitor forming portion 227, so as to be continued to the capacitor forming portion 227 and that is arranged so as to be overlapped with at least a part of the first light shielding portion 230A. As a result, as compared to a case where it is assumed that the second light shielding portion is formed of another conductor film in which an insulating film is interposed between the conductor film and the capacitor forming portion 227 and the second light shielding portion and the capacitor forming portion 227 are connected by the contact hole that is formed so as to be opened in the insulating film, generation of the dark portion caused by such a contact hole is avoided. Additionally, since the second light shielding portion 230B continued to the capacitor forming portion 227 is arranged so as to be overlapped with at least a part of the first light shielding portion 230A continued to the connection portion 228, electrostatic capacitance formed between the capacitor forming portion 227 and the connection portion 228 is increased. Thereby, a more favorable potential of the pixel electrode 212 is kept.

Moreover, the first light shielding portion 230A and the second light shielding portion 230B have respective second non-overlapping portions 32 and 33 in which the first light shielding portion 230A and the second light shielding portion 230B are not overlapped with each other in the extension direction, and are provided so that arrangement of the second non-overlapping portions 32 and 33 in the extension direction is switched between one side and the other side in the crossing direction. The second non-overlapping portions 32 and 33 are generated when the first light shielding portion 230A and the second light shielding portion 230B are provided at positions according to design, and when the first light shielding portion 230A and the second light shielding portion 230B are shifted in the extension direction from the designed positions, the non-overlapping portions can be partially overlapped with the first light shielding portion 230A and the second light shielding portion 230B. Similarly, in a case where portions in which the first light shielding portion 230A and the second light shielding portion 230B are overlapped with each other when the first light shielding portion 230A and the second light shielding portion 230B are provided at the positions according to design are shifted in the extension direction as described above, the overlapping portions cannot be partially overlapped with the first light shielding portion 230A and the second light shielding portion 230B. Since the first light shielding portion 230A and the second light shielding portion 230B are provided so that arrangement of the second non-overlapping portions 32 and 33 in the extension direction is switched between one side and the other side in the crossing direction, even when an area where the first light shielding portion 230A and the second light shielding portion 230B are overlapped is increased or reduced on one side in the crossing direction in accordance with generation of the positional shift in the extension direction as described above, an area where the first light shielding portion 230A and the second light shielding portion 230B are overlapped is reduced or increased on the other side in the crossing direction. Thus, even when the positional shift in the extension direction as described above is generated, the entire area where the first light shielding portion 230A and the second light shielding portion 230B are overlapped is difficult to vary, so that electrostatic capacitance formed between the connection portion 228 and the capacitor forming portion 227 is also difficult to vary.

Embodiment 4

Embodiment 4 of the disclosure will be described with reference to FIGS. 14 to 17. Embodiment 4 includes an edge light shielding portion 331 whose configuration is changed from that of Embodiment 1 described above. Note that, redundant description for a structure, an action, and an effect similar to those of Embodiment 1 described above will be omitted.

Figure 14:
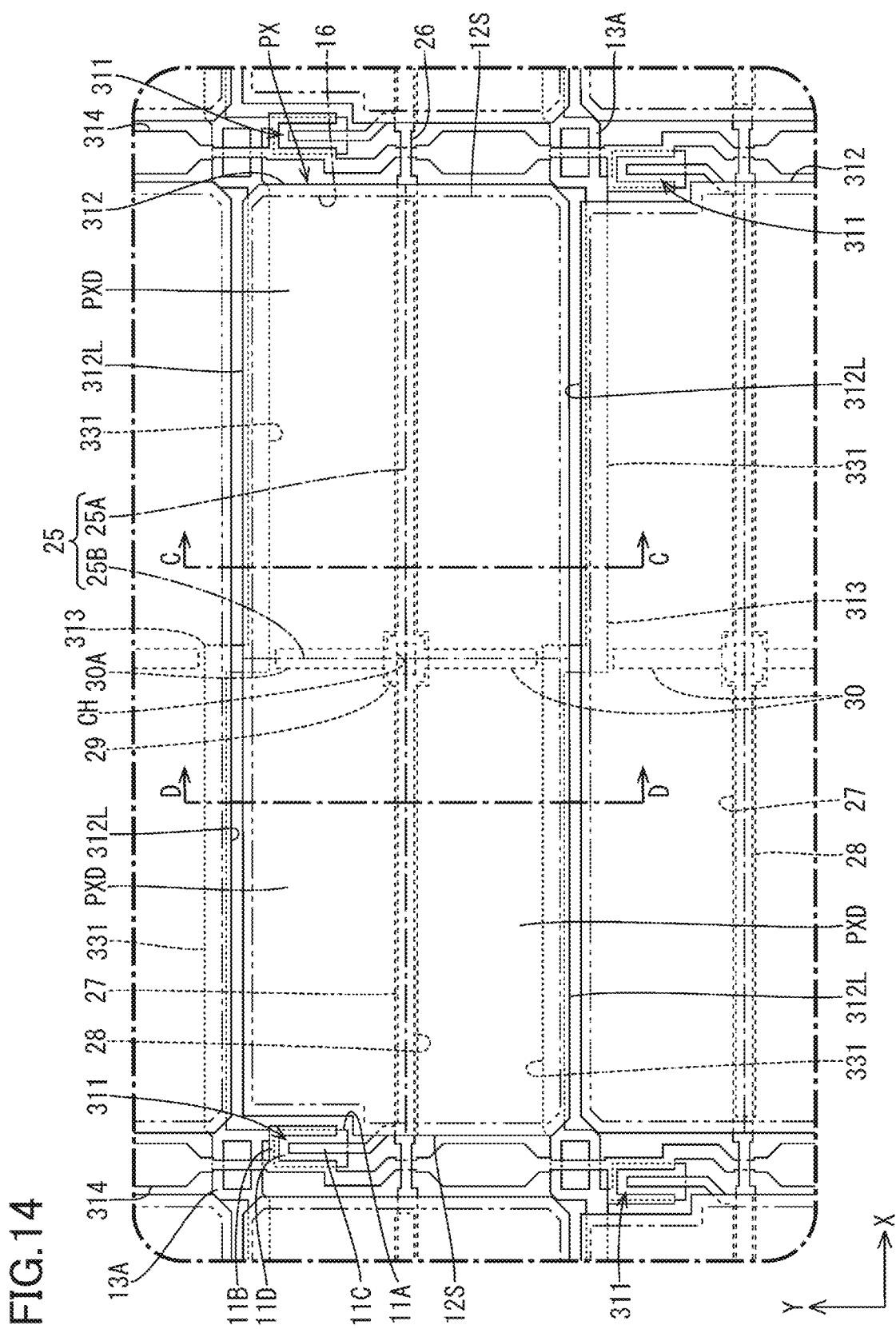
FIG. 14 is a plan view illustrating a pixel array in an array substrate constituting a liquid crystal panel according to Embodiment 4 of the disclosure.
Figure 15:
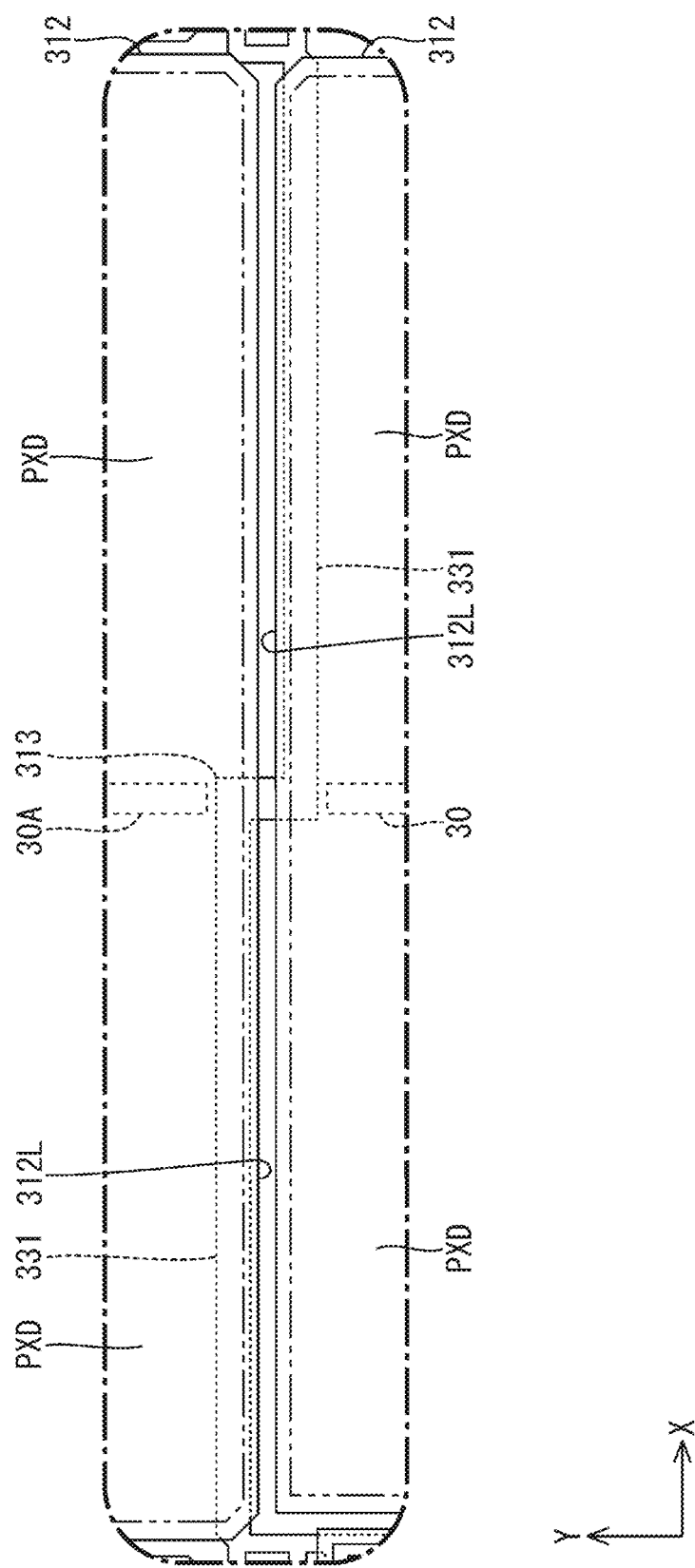
FIG. 15 is a plan view in which a vicinity of a gate line in the array substrate is enlarged.

The edge light shielding portion 331 according to the present embodiment is formed of a part of a gate line 313 as illustrated in FIG. 14. Specifically, as illustrated in FIG. 15, the gate line 313 is bent so as to have a crank shape near a center position of a pixel electrode 312 in the X-axis direction and near a crossing position with a source line 314, and is routed in a zigzag manner as a whole. A part of the gate line 313, which extends along the X-axis direction, constitutes the edge light shielding portion 313. The edge light shielding portion 331 is arranged so as to be overlapped with at least a long-side edge 312L which is included in an outer periphery of the pixel electrode 312 and in which an azimuthal direction that is perpendicular to the edge and points toward an inside of the pixel electrode 312 defines an obtuse angle with respect to the tilt direction of the liquid crystal molecules near a middle of a liquid crystal layer 310C in a thickness direction when a voltage is applied to the liquid crystal layer 310C. In a case where alignment of the liquid crystal molecules is disturbed due to alignment restriction force applied to the liquid crystal molecules by an electric field generated between the gate line 313 and the long-side edge 312L which is included in the outer periphery of the pixel electrode 312 and in which an azimuthal direction that is perpendicular to the edge and points toward the inside of the pixel electrode 312 defines an obtuse angle with respect to the tilt direction of the liquid crystal molecules near the middle of the liquid crystal layer 310C in the thickness direction when a voltage is applied to the liquid crystal layer 310C, the edge light shielding portion 331 formed of a part of the gate lines 313 makes it difficult to visually recognize the dark portion caused by the disturbed alignment.

Figure 16:
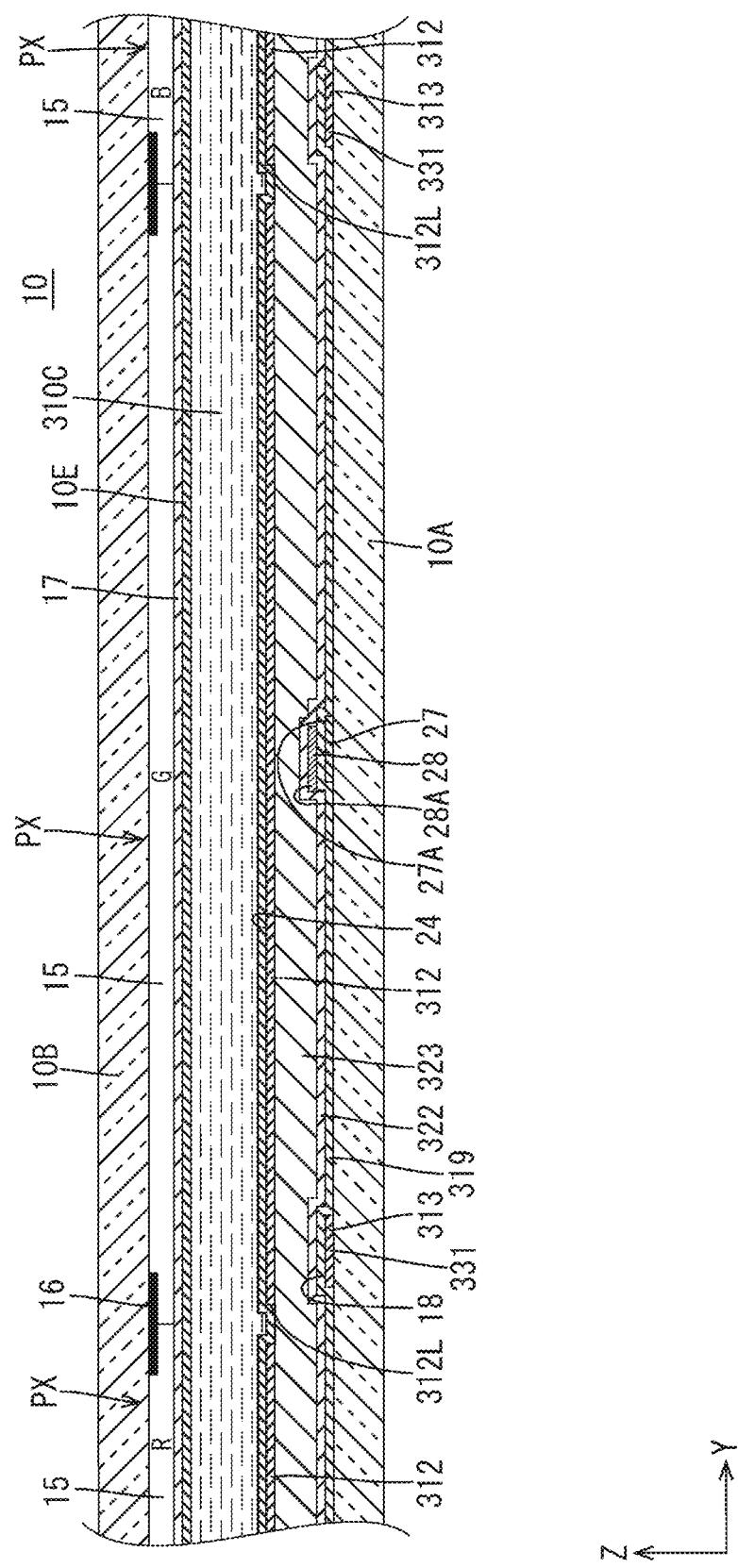
FIG. 16 is a sectional view of the liquid crystal panel taken along a line XVI-XVI of FIG. 2.
Figure 17:
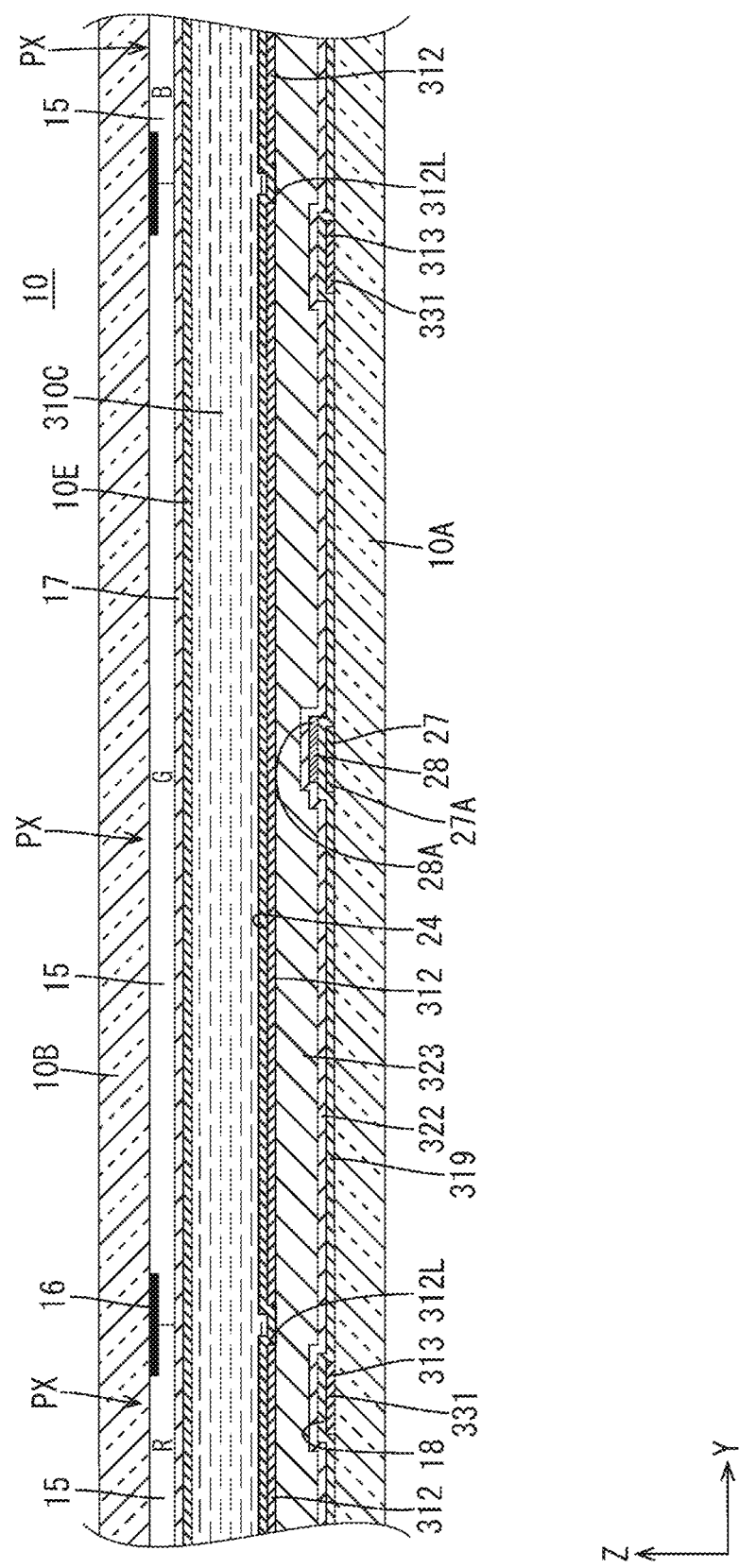
FIG. 17 is a sectional view of the liquid crystal panel taken along a line XVII-XVII of FIG. 2.

As illustrated in FIGS. 16 and 17, the gate line 313 is arranged on a lower layer side of the pixel electrode 312, which is to be overlapped, with a gate insulating film 319, an inter-layer insulating film 322, and a flattening film 323 in between, that is, on a side opposite to the liquid crystal layer 310C. As a result, an electric field generated near the gate line 313 is shielded by the pixel electrode 312 and an influence is difficult to be given on the liquid crystal layer 310C. Thereby, alignment of the liquid crystal molecules included in the liquid crystal layer 310C is difficult to be disturbed.

As described above, according to the present embodiment, a TFT (switching element) 311 that has a connection portion 328, and the gate line (scanning line) 313 that extends along the extension direction and is connected to the TFT 311 to transfer a signal by which the TFT 311 is driven may be included, and the edge light shielding portion 331 may be formed of a part of the gate line 313. As a result, when the TFT 311 is driven on the basis of the signal transferred to the gate line 313, the pixel electrode 312 connected to the connection portion 328 of the TFT 311 is charged. The edge light shielding portion 331 formed of a part of the gate line 313 makes it difficult to visually recognize display failure caused by disturbed alignment of the liquid crystal molecules generated near an edge which is included in the outer periphery of the pixel electrode 312 and in which an azimuthal direction that is perpendicular to the edge and points toward an inside of the pixel electrode 312 defines an obtuse angle with respect to the tilt direction of the liquid crystal molecules near the middle of the liquid crystal layer 310C in the thickness direction when a voltage is applied to the liquid crystal layer 310C.

Moreover, the gate line 313 may be arranged on a side of the pixel electrode 312 opposite to the liquid crystal layer 310C with the gate insulating film 319, the inter-layer insulating film 322, and the flattening film 323 (insulating film) in between. As a result, an electric field generated between the gate line 313 and the pixel electrode 312 is difficult to give influence on the liquid crystal layer 310C. Thereby, alignment of the liquid crystal molecules included in the liquid crystal layer 310C is difficult to be disturbed.

Other Embodiments

The disclosure is not limited to the embodiments described above and illustrated by the drawings. For example, the following embodiments are also included in the technical scope of the disclosure.

(1) In addition to the embodiments described above, setting of the tilt direction of the liquid crystal molecules in each domain of the pixel portion is able to be appropriately changed. For example, the tilt direction of the liquid crystal molecules near the middle of the liquid crystal layer in the thickness direction when a voltage is applied to the liquid crystal layer of four domains constituting the pixel portion may be set so as to be arranged in a reverse manner to that of Embodiment 1 described above.

(2) In addition to (1) described above, the tilt direction of the liquid crystal molecules in four domains may be set so as to point toward the center of the pixel portion. In such a case, over an entire region of the outer periphery of the pixel electrode, an azimuthal direction which is perpendicular to an edge thereof and points toward the inside of the pixel electrode defines an acute angle with respect to the tilt direction of the liquid crystal molecules, so that the dark portion is difficult to be generated over an entire perimeter near the outer periphery. Thus, it may be said that such a configuration is suitable when the edge light shielding portion is omitted.

(3) In addition to (1) and (2) described above, the tilt direction of the liquid crystal molecules in four domains may be set so as to point toward an outside radially from the center of the pixel portion. In such a case, over the entire region of the outer periphery of the pixel electrode, an azimuthal direction which is perpendicular to an edge thereof and points toward the inside of the pixel electrode defines an obtuse angle with respect to the tilt direction of the liquid crystal molecules, so that the dark portion is easily generated over an entire perimeter near the outer periphery. In such a configuration, though it is most desirable that the edge light shielding portion is arranged so as to be overlapped with the entire perimeter of the outer periphery of the pixel electrode, it is also desirable that the edge light shielding portion is overlapped with a long-side edge of the pixel electrode over a whole length because visual recognition of the dark portion is able to be sufficiently suppressed.

(4) In addition to the illustrated drawings in the embodiments described above, specific arrangement of the non-overlapping portions in the capacitor forming portion and the connection portion is able to be appropriately changed. Further, widths of the capacitor forming portion and the connection portion, and a specific ratio of a width (positional shift amount of the capacitor forming portion or the connection portion) of a non-overlapping portion relative to a width of an overlapping portion are also able to be appropriately changed.

(5) Though the embodiments described above exemplify a case where the widths of the capacitor forming portion and the connection portion are almost the same, the widths of the capacitor forming portion and the connection portion may be different from each other. Similarly, widths of the non-overlapping portion on the capacitor forming portion side and the non-overlapping portion on the connection portion side may be different from each other.

(6) Though the embodiments described above indicate a case where the capacitor forming portion and the connection portion substantially have a rotationally symmetric shape, the capacitor forming portion and the connection portion may have a rotationally asymmetric shape. For example, the capacitor forming portion and the connection portion may be different in dimensions of the non-overlapping portions in the X-axis direction between one side and the other side in the X-axis direction. Moreover, the capacitor forming portion and the connection portion may be different in dimensions of the non-overlapping portions in the Y-axis direction between one side and the other side in the X-axis direction.

(7) Though the embodiments described above indicate a case where the capacitor forming portion and the connection portion are different in position in the Y-axis direction between one side and the other side in the X-axis direction, the capacitor forming portion and the connection portion may be formed so that a position of one of them in the Y-axis direction does not vary between one side and the other side in the X-axis direction and a position of the other in the Y-axis direction is different between one side and the other side in the X-axis direction.

(8) Though the embodiments described above indicate a case where the drain electrode and the capacitor forming portion have respective non-overlapping portions over a whole length, a part of the drain electrode and a part of the capacitor forming portion may have a relationship to be overlapped with each other without including non-overlapping portions.

(9) A configuration described in Embodiment 3 described above is also able to be combined with a configuration of Embodiment 1 described above.

(10) A configuration described in Embodiment 4 described above is also able to be combined with a configuration of Embodiment 3 described above.

(11) Though Embodiments 1 and 4 described above indicate a case where the edge light shielding portion is arranged so as to be overlapped only with a long-side edge of the outer periphery of the pixel electrode, the edge light shielding portion may be arranged so as to be overlapped with a short-side edge of the outer periphery of the pixel electrode. In such a case, the edge light shielding portion is also able to be arranged so as to be overlapped only with the short-side edge of the outer periphery of the pixel electrode, but the edge light shielding portion is also able to be arranged so as to be overlapped with both the long-side edge and the short-side edge of the outer periphery of the pixel electrode. For example, as illustrated in FIG. 18, a second edge light shielding portion (edge light shielding portion) 31A that is continued to the capacitor forming portion 27 so as to extend along the Y-axis direction and is arranged so as to be overlapped with the short-side edge 12S of the pixel electrode 12 may be provided together with the edge light shielding portion 31 overlapped with the long-side edge 12L of the pixel electrode 12. The second edge light shielding portion 31A is formed of the first metal film which is the same as that of the capacitor forming portion 27. The second edge light shielding portion 31A is provided in each of two capacitor forming portions 27 adjacent to each other with the gate line 13 held therebetween in the Y-axis direction, and extends from each of the capacitor forming portions 27 in a direction close to the gate line 13 along the Y-axis direction. Each of edge light shielding portions 31A is connected to each of bridge electrodes 34 extending along the Y-axis direction by crossing over the gate line 13. The bridge electrode 34 is desirably formed of the transparent electrode film which is the same as that of the pixel electrode 12. Though the bridge electrode 34 formed of the transparent electrode film crosses not only the gate line 13 formed of the first metal film but also the edge light shielding portion 31 formed of the second metal film, short-circuit between the bridge electrode 34 and the gate line 13 or the edge light shielding portion 31 is avoided. In a gate insulating film, an inter-layer insulating film, a flattening film that are interposed between the edge light shielding portion 31A and the bridge electrode 34, a contact hole 35 by which the edge light shielding portion 31A and the bridge electrode 34 are connected is formed so as to be opened. According to such a configuration, redundancy of the capacitor line 26 is improved so that a case where resistance distribution of the capacitor line 26 in the display region becomes great is able to be suppressed. Note that, the edge light shielding portion 31 that is overlapped with the long-side edge 12L of the pixel electrode 12 is also able to be omitted from a configuration illustrated in FIG. 18. Moreover, in a case where the bridge electrode 34 is arranged so as not to cross the edge light shielding portion 31, the bridge electrode 34 is also able to be formed of the second metal film. The second edge light shielding portion 31A may not be continued to the capacitor forming portion 27 and may be continued to the connection portion 28, similarly to the edge light shielding portion 31.

(12) Though the embodiments described above indicate a case where the light shielding portion is formed of the second metal film which is the same as that of the connection portion (drain electrode), the light shielding portion may be formed of a metal film different from that of the connection portion, a transparent electrode film, or a semiconductor film (in particular, a semiconductor film that is processed so as to achieve low resistance as compared to a semiconductor film forming the channel portion of the TFT), or may be formed in layers thereof. For example, a second light shielding portion may be formed by using a semiconductor film that is processed so as to achieve low resistance as compared to the semiconductor film forming the channel portion of the TFT and the second light shielding portion may be continued to the light shielding portion 30 (refer to FIG. 2) described in Embodiment 1 and the like. At this time, the second light shielding portion is formed in a layer directly below the light shielding portion 30 without using an insulating film so that conduction between the second light shielding portion and the light shielding portion 30 is made. Similarly to the above, the edge light shielding portion described in Embodiments 1 and 4 may be formed of a metal film different from that of the connection portion, a transparent electrode film, or a semiconductor film (in particular, a semiconductor film that is processed so as to achieve low resistance as compared to the semiconductor film forming the channel portion of the TFT), or may be formed in layers thereof. Note that, in order for the light shielding portion or the edge light shielding portion, which is formed of the metal film different from that of the connection portion, to be connected to the connection portion, the contact hole may be formed so as to be opened in the insulating film interposed between the light shielding portion or the edge light shielding portion and the connection portion. Even when the light shielding portion or the edge light shielding portion is formed of a transparent electrode film or the like, an effect of shielding an electric field generated between the gate line or the source line and the pixel electrode is able to be obtained by increasing electrostatic capacitance.

(13) Though the embodiments described above indicate a case where the light shielding portion is electrically connected to the connection portion, the light shielding portion may not be electrically connected to the connection portion. Similarly to the above, the edge light shielding portion described in Embodiments 1 and 4 may not be electrically connected to the connection portion. In this case, the light shielding portion or the edge light shielding portion that is not connected to the connection portion is also able to be formed of a metal film (conductor film) which is different from that of the connection portion, but may be formed of the second metal film which is the same as that of the connection portion.

(14) In addition to the embodiments described above, the light shielding portion is also able to be omitted. Similarly, the edge light shielding portion described in Embodiments 1 and 4 is also able to be omitted.

(15) Though the embodiments described above indicate a case where the number of domains in the pixel portion is 4, the number of domains in the pixel portion may be other than 4 (may be, for example, 2, 6, 8, or the like).

(16) Though the embodiments described above indicate a case where the alignment film is subjected to a photo alignment process so as to be a photo alignment film exerting alignment restriction force to the liquid crystal molecules, the alignment film may be a vertical alignment film that is not a photo alignment film. In this case, it is desirable that, for example, a rib (protrusion) and a slit (recess) are formed on a surface of the array substrate or the CF substrate so that alignment restriction force for the liquid crystal molecules is obtained by the lib and the slit.

(17) Though the embodiments described above indicate a case where the alignment film is formed in each of the array substrate and the CF substrate, the alignment film may be provided only in any one of the array substrate and the CF substrate.

(18) Though the embodiments described above indicate a case where the TFTs are arranged in a zigzag manner in plan view in the array substrate, the TFTs may be arranged in a matrix form in plan view.

(19) Though the embodiments described above indicate a case where the gate circuit portion is provided in the array substrate, the gate circuit portion may be omitted and a gate driver having a function similar to that of the gate circuit portion may be mounted on the array substrate.

(20) Though the embodiments described above indicate a case the driver is mounted on the array substrate by the COG method, the driver may be mounted on a flexible substrate by a COF (Chip On Film) method. In this case, the flexible substrate is mounted on the array substrate by an FOG (Film On Glass) method.

(21) Though the embodiments described above indicate a case where the semiconductor film constituting the channel portion of the TFT is formed of the oxide semiconductor, the semiconductor film may be formed of amorphous silicon. Moreover, the semiconductor film may be polysilicon, and in this case, it is desirable that the TFT is of a bottom gate type or a top gate type in which a light shielding film is provided in a lower layer (side of the array substrate where a polarizer is attached) of the channel portion.

(22) Though the embodiments described above indicate a case where the pixel electrode has a horizontally-long longitudinal shape, the pixel electrode may have a vertically-long longitudinal shape. Moreover, the pixel electrode may have a non-longitudinal planar shape such as a square.

(23) Though the embodiments described above exemplify a liquid crystal display apparatus including a liquid crystal panel of a transparent type, a liquid crystal display apparatus including a liquid crystal panel of a reflection type or a liquid crystal panel of a semi-transparent type may be provided.

The present disclosure contains subject matter related to that disclosed in Japanese Priority Patent Application JP 2019-032995 filed in the Japan Patent Office on Feb. 26, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
    a liquid crystal layer that includes liquid crystal molecules;
    a plurality of domains that are different in alignment direction of the liquid crystal molecules when a voltage is applied to the liquid crystal layer;
    an alignment boundary portion that is positioned in a boundary of the plurality of domains;
    an alignment film that aligns the liquid crystal molecules;
    a pixel electrode;
    a connection portion that is connected to the pixel electrode and arranged so as to be overlapped with at least a part of the alignment boundary portion; and
    a capacitor forming portion that is arranged so as to be partially overlapped with a part of the connection portion with an insulating film in between and forms electrostatic capacitance between the capacitor forming portion and the connection portion, wherein
    the connection portion and the capacitor forming portion extend along at least a part of the alignment boundary portion, have respective non-overlapping portions in which the connection portion and the capacitor forming portion are not overlapped with each other in a crossing direction that crosses an extension direction of the connection portion and the capacitor forming portion, and are provided so that arrangement of the non-overlapping portions in the crossing direction is switched between one side and another side in the extension direction.

2. The display apparatus according to claim 1, wherein the connection portion and the capacitor forming portion are provided so that dimensions of the non-overlapping portions in the extension direction are equal between one side and the other side in the extension direction.

3. The display apparatus according to claim 1, wherein the connection portion and the capacitor forming portion are provided so that dimensions of the non-overlapping portions in the crossing direction are equal between one side and the other side in the extension direction.

4. The display apparatus according to claim 1, wherein the connection portion and the capacitor forming portion substantially have a rotationally symmetric shape.

5. The display apparatus according to claim 1, wherein
    the pixel electrode has a longitudinal shape, and
    the connection portion and the capacitor forming portion are provided so that the extension direction coincides with a longitudinal direction of the pixel electrode.

6. The display apparatus according to claim 1, further comprising
    a light shielding portion that extends along the crossing direction and is arranged so as to be overlapped with the second alignment boundary portion, wherein
    the alignment boundary portion includes a first alignment boundary portion that extends along the extension direction and is overlapped with the connection portion and a second alignment boundary portion that extends along the crossing direction.

7. The display apparatus according to claim 6, wherein the light shielding portion includes a first light shielding portion that is formed of a conductor film, which is identical with that of the connection portion, and is continued to the connection portion.

8. The display apparatus according to claim 7, wherein the light shielding portion includes a second light shielding portion that is formed of a conductor film, which is identical with that of the capacitor forming portion, so as to be continued to the capacitor forming portion and is arranged so as to be overlapped with at least a part of the first light shielding portion.

9. The display apparatus according to claim 8, wherein the first light shielding portion and the second light shielding portion have respective second non-overlapping portions in which the first light shielding portion and the second light shielding portion are not overlapped with each other in the extension direction, and are provided so that arrangement of the second non-overlapping portions in the extension direction is switched between one side and another side in the crossing direction.

10. The display apparatus according to claim 1 further comprising an edge light shielding portion that is arranged so as to be overlapped with at least a part of an edge which is included in an outer periphery of the pixel electrode and in which an azimuthal direction that is perpendicular to the edge and points toward an inside of the pixel electrode defines an obtuse angle with respect to a tilt direction of the liquid crystal molecules near a middle of the liquid crystal layer in a thickness direction when a voltage is applied to the liquid crystal layer.

11. The display apparatus according to claim 10, wherein the edge light shielding portion is formed of a conductor film, which is identical with that of the connection portion, and is continued to the connection portion.

12. The display apparatus according to claim 10, further comprising:
a switching element that has the connection portion; and
a scanning line that extends along the extension direction and is connected to the switching element to transfer a signal by which the switching element is driven, wherein
the edge light shielding portion is formed of a part of the scanning line.

13. The display apparatus according to claim 12, wherein the scanning line is arranged on a side of the pixel electrode opposite to the liquid crystal layer with an insulating film in between.

14. The display apparatus according to claim 1, wherein
the alignment boundary portion includes a first alignment boundary portion that extends along the extension direction and is overlapped with the connection portion and a second alignment boundary portion that extends along the crossing direction,
the connection portion has a connection electrode that is overlapped with a part of the pixel electrode with an insulating film in between and is connected to the pixel electrode through a contact hole formed so as to be opened in the insulating film, and
the connection electrode is arranged at a crossing position of the first alignment boundary portion and the second alignment boundary portion.

15. The display apparatus according to claim 1, further comprising:
a switching element that has the connection portion;
a scanning line that extends along the extension direction and is connected to the switching element to transfer a signal by which the switching element is driven; and
an image line that extends along the crossing direction and is connected to the switching element to transfer a signal by which the pixel electrode is charged, wherein
the capacitor forming portion is formed of a conductor film which is identical with that of the scanning line, and the connection portion is formed of a conductor film which is identical with that of the image line.

* * * * *